United States Patent
Kato

(10) Patent No.: US 6,333,996 B1
(45) Date of Patent: Dec. 25, 2001

(54) HANDWRITING CODE PROCESSING DEVICE ENABLING REDUCTION IN LOAD ON PROCESSING OF HANDWRITING INPUT DEVICE AND PROCESSING METHOD THEREOF

(75) Inventor: Kiyoshi Kato, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/212,439

(22) Filed: Dec. 16, 1998

(30) Foreign Application Priority Data

Dec. 17, 1997 (JP) .................................................. 9-348031

(51) Int. Cl.[7] .................................................. G06K 9/00
(52) U.S. Cl. .................................................. 382/189; 382/188
(58) Field of Search .................................... 382/189, 190, 382/192, 193, 194, 195, 196, 188, 187, 186

(56) References Cited

U.S. PATENT DOCUMENTS

| | | | |
|---|---|---|---|
| 5,260,697 | * 11/1993 | Barrett et al. | 345/173 |
| 5,365,598 | * 11/1994 | Sklarew | 382/13 |
| 5,497,432 | * 3/1996 | Nishida | 382/229 |
| 5,727,081 | * 3/1998 | Burges et al. | 382/229 |
| 5,729,629 | * 3/1998 | Dai | 382/187 |

FOREIGN PATENT DOCUMENTS

| | | |
|---|---|---|
| 3-163961 | 7/1991 | (JP) . |
| 9-190275 | 7/1997 | (JP) . |
| 9-258885 | 10/1997 | (JP) . |

\* cited by examiner

*Primary Examiner*—Andrew W. Johns
*Assistant Examiner*—Seyed Azarian
(74) *Attorney, Agent, or Firm*—Foley & Lardner

(57) ABSTRACT

A handwriting code processing device mounted on a handwriting input device and including a setting register for holding information about hardware characteristics of a display unit and a handwriting input unit, an input control unit for converting coordinate data into handwriting information independent of hardware according to characteristics information held by the setting register, a processing unit for executing data processing with respect to handwriting information to generate and output handwriting information for display to be displayed on the display unit according to processing results, and a display control unit for generating a display screen from handwriting information for display and causing the display unit to display the screen according to characteristics information held at the setting register.

24 Claims, 17 Drawing Sheets

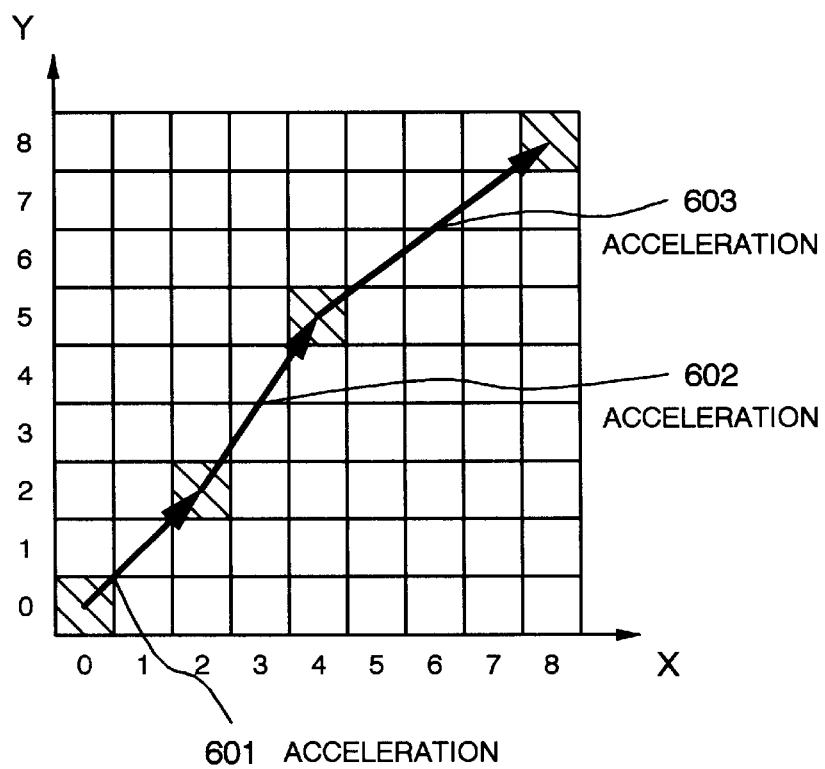

FIG. 11

| | BIT 7 | BIT 6 | BIT 5 | BIT 4 | BIT 3 | BIT 2 | BIT 1 | BIT 0 |
|---|---|---|---|---|---|---|---|---|
| ACCELERATION 601 | 0 | 0 | 0 | 1 | 0 | 0 | 1 | 0 |
| ACCELERATION 602 | 1 | 0 | 0 | 0 | 0 | 0 | 1 | 0 |
|  | 0 | 1 | 0 | 0 | 0 | 0 | 1 | 1 |
| ACCELERATION 603 | 1 | 0 | 0 | 0 | 0 | 1 | 0 | 0 |
|  | 0 | 1 | 0 | 0 | 0 | 0 | 1 | 1 |

|X,Y| ≤ 4

|X,Y| ≤ 1

EXAMPLE OF THREE-TIME ENLARGEMENT

611 ACCELERATION
612 ACCELERATION
613 ACCELERATION

HANDWRITING CODE PROCESSING DEVICE ENABLING REDUCTION IN LOAD ON PROCESSING OF HANDWRITING INPUT DEVICE AND PROCESSING METHOD THEREOF

BACKGROUND OF THE INVENTION

1. Field of the Invention

The present invention relates to a handwriting code processing device enabling reduction in load on processing of an input device which electronically realizes operability of writing utensils that paper and a pen produce by coding handwriting input by a user at high efficiency without reducing power of expression which handwritings have, and a processing method thereof.

2. Description of the Related Art

There is an increasing demand, as an input means of a portable terminal device for general users, for an input device which realizes operability of writing utensils that paper and a pen produce by combining a touch panel and a display device (hereinafter referred to as a handwriting input display device). Among the reasons are that training of operation which is required for a keyboard and a mouse is unnecessary because inputting is possible by almost the same sense of operation as that of handwriting and that it is unnecessary to ensure working space for input operation which is required for a keyboard and a mouse because of direct operation to a display screen of the device.

Known as a conventional handwriting input coding technique employed in a handwriting input display device of this kind is zone-coding (CCITT recommendations T.150, JT-T. 150 standard in Japan). Zone-coding is a coding system making use of the characteristics that a vector indicative of a difference between two successive coordinate points in handwriting input is small in magnitude and small in direction change. Conventional handwriting code processing devices employing zone-coding such as a telewriting terminal realize high compressibility by variable-length codes on a bit basis.

The zone-coding system, however, has a shortcoming that since no coding is made of a succession of the same values, with respect to input without variation, the number of codes will be increased to increase the load on processing of the input device as a whole.

In addition, since compressibility is decreased as a difference vector calculated at coding is increased, sufficient compressibility could not be achieved depending on a precision of detection of handwriting input by a device. It is also difficult to appropriately display handwritings coded at input devices with different detection precisions.

Moreover, although precision of handwriting operation itself, such as unintentional movement of a user's hand, changes depending on the contents of handwriting operation, precision of data coded for the coordinate detection and displaying remains constant to fail to correspond to the contents of handwriting operation. Therefore, a rough line drawn quickly by a user, for example, will be detected with a higher precision than intended to output a large volume of codes, resulting in increasing the load on processing.

Furthermore, it is very difficult to edit part of coded data because code length and value can not be determined unless every point from the beginning of the coded data is decoded in sequence.

Another known conventional handwriting input coding technique is a still picture coding system which detects and codes a period of a succession of the same values. An example of a coding technique of this kind is recited in Japanese Patent Laying-Open (Kokai) No. Heisei 3-163961, entitled "Image Compression Method". The literature discloses an image compression method of obtaining compressed data from multivalued image data by discriminating, as to multivalued image data obtained by scanning image and sampling on an image basis, a period when the same concentration level continues from a period when concentration level change succeeds one after another and converting the multivalued image data in the period when the same concentration level continues into a code peculiar to a length of the period.

Increasing compressibility for handwriting information coding by applying such a general-purpose coding system as recited in the above literature might result in losing the order of or the amount of change in a sequence of coordinate points of handwriting input in some cases because characteristics of handwriting input data and those of still picture data differ from each other. As a result, it is impossible to employ such handwriting reproduction processing with reduced processing load which makes use of the characteristics of user's handwriting operation as recited in Japanese Patent Laying-Open (Kokai) No. Heisei 9-190275 (corresponding U.S. patent application Ser. No. 08/781, 807), entitled "Handwriting Input Display Device", making rapid-response displays difficult, as well as degrading quality of handwriting displays.

Japanese Patent Laying-Open (Kokai) No. Heisei 9-190275 discloses a handwriting input display device including a subsequent input point predicting means for generating a predicted coordinate point for each coordinate point received from an input means in order to reduce a delay time from handwriting input made by a user until execution of response display, a point of passage predicting means for receiving a sequence of coordinate points from the subsequent input point predicting means to insert a new sequence of coordinate points between adjacent coordinate points in order to output a sequence of coordinate points forming a smooth handwritten curve, and a processing means for instructing the subsequent input point predicting means on a calculation method for generating a predicted coordinate point and instructing the point of passage predicting means on a coordinate point insertion method to display a curve based on a sequence of coordinate points obtained from the point of passage predicting means on a display means.

As described in the foregoing, handwriting code processing techniques employed in conventional handwriting input display devices fail to sufficiently realize such facility as that of actual paper and pens.

SUMMARY OF THE INVENTION

An object of the present invention is to provide a handwriting code processing device which solves the above-described conventional shortcomings and improves processing efficiency without deteriorating quality of handwriting to realize good-response and high-quality handwriting operation and a processing method thereof.

Another object of the present invention is to provide a handwriting code processing device realizing, in addition to the above-described object, stable data compression and a processing method thereof.

A further object of the present invention is to provide a handwriting coding processing device which realizes, in addition to the above-described objects, facilitation of partial reference and editing of coded data and a processing method thereof.

According to the first aspect of the invention, a handwriting code processing device for processing handwriting input data mounted on a handwriting input device which electronically realizes operability of writing utensils that paper and a pen produce by combining display means for displaying two-dimensional image and handwriting input means for detecting user's handwriting operation to obtain coordinate data corresponding to screen coordinates of the display means, comprises setting register for holding information about hardware characteristics of the display means and the handwriting input means, input control means for converting coordinate data detected by the handwriting input means into handwriting information independent of hardware according to characteristics information held by the setting register, processing means for receiving handwriting information from the input control means to execute data processing and generating and outputting handwriting information for display to be displayed on the display means according to processing results, and display control means for generating a display screen from the handwriting information for display and causing the display means to display the display screen according to characteristics information held by the setting register.

In the preferred construction, the processing means modifies characteristics information held by the setting register based on the processing results as required.

In another preferred construction, the input control means outputs, as the handwriting information, an acceleration vector which is a difference vector of rate vectors linking two coordinate points among successive input coordinate points.

In another preferred construction, the handwriting code processing device further comprises communication means for communicating with other handwriting code processing device, wherein the processing means has a further function of modifying characteristics information held by the setting register based on results of communication with other handwriting code processing device connected through the communication means as required.

According to the second aspect of the invention, a handwriting code processing device for processing handwriting input data mounted on a handwriting input device which electronically realizes operability of writing utensils that paper and a pen produce by combining display means for displaying two-dimensional image and handwriting input means for detecting user's handwriting operation to obtain coordinate data corresponding to screen coordinates of the display means, comprising setting register for holding information about hardware characteristics of the display means and the handwriting input means, input control means for converting coordinate data detected by the handwriting input means into handwriting information independent of hardware according to characteristics information held by the setting register, handwriting coding means for receiving handwriting information from the input control means to generate and output a handwriting code subjected to compressed-coding according to characteristics of the handwriting information, processing means for receiving a handwriting code subjected to compressed-coding from the handwriting coding means to execute data processing and generating and outputting a handwriting code for display subjected to compressed-coding to be displayed on the display means according to processing results, handwriting code decoding means for receiving the handwriting code for display from the processing means and decoding the code to generate and output handwriting information for display, and display control means for receiving the handwriting information for display from the handwriting code decoding means to generate a display screen from the handwriting information for display and causing the display means to display the display screen according to characteristics information held by the setting register.

In the preferred construction, the processing means modifies characteristics information held by the setting register based on the processing results as required.

In another preferred construction, the handwriting coding means comprises vector code generating means for extracting a vector component of the handwriting information received from the input control means to generate a vector code, succession code generating means for extracting the same values in succession of the handwriting information to generate a succession code, and code length control means for receiving the vector code from the vector code generating means and the succession code from the succession code generating means to generate a handwriting code by adjusting and synthesizing code lengths of the vector code and the succession code so as to have data of the size of a predetermined number of fundamental bits or a multiple of the number, and the handwriting code decoding means comprises code separating means for receiving the handwriting code to separate the code into the vector code and the succession code and outputting the codes separately, vector code decoding means for decoding and outputting the vector code obtained by the code separating means, and succession code decoding means for decoding and outputting the succession code obtained by the code separating means.

In another preferred construction, the handwriting coding means comprises input rate determining means for determining an input rate of handwriting operation from the handwriting information received from the input control means, input resolution control means for reducing the handwriting information based on determination results obtained by the input rate determining means and outputting the reduced handwriting information as required, vector code generating means for extracting a vector component of the handwriting information suitably reduced by the input resolution control means to generate a vector code, succession code generating means for extracting the same values in succession of the handwriting information suitably reduced by the input resolution control means to generate a succession code, and code length control means for receiving the vector code from the vector code generating means and the succession code from the succession code generating means to generate a handwriting code by adjusting and synthesizing code lengths of the vector code and the succession code so as to have data of the size of a predetermined number of fundamental bits or a multiple of the number, and the handwriting code decoding means comprises code separating means for receiving the handwriting code to separate the code into the vector code and the succession code and outputting the codes separately, vector code decoding means for decoding and outputting the vector code obtained by the code separating means, succession code decoding means for decoding and outputting the succession code obtained by the code separating means, output rate determining means for determining, from handwriting information output to the display control means, a rate of the corresponding handwriting input, and output resolution control means for receiving input of decoded handwriting information from the vector code decoding means and the succession code decoding means to suitably expand the handwriting information according to determination results obtained by the output rate determining means and output the obtained information as the handwriting information.

In another preferred construction, the handwriting coding means comprises vector code generating means for extracting a vector component of the handwriting information received from the input control means to generate a vector code, succession code generating means for extracting the same values in succession of the handwriting information to generate a succession code, and code length control means for receiving the vector code from the vector code generating means and the succession code from the succession code generating means to generate a handwriting code by adjusting and synthesizing code lengths of the vector code and the succession code so as to increase a code length of the succession code when a code length of the vector code is short and shorten the code length of the succession code when the code length of the vector code is long and so as to make the vector code and the succession code a variable-length code with eight bits or an integral multiple of eight bits, the handwriting code decoding means comprises code separating means for receiving the handwriting code to separate the code into the vector code and the succession code and outputting the codes separately, vector code decoding means for decoding and outputting the vector code obtained by the code separating means, and succession code decoding means for decoding and outputting the succession code obtained by the code separating means.

In another preferred construction, the handwriting coding means comprises input rate determining means for determining an input rate of handwriting operation from the handwriting information received from the input control means, input resolution control means for reducing the handwriting information based on determination results obtained by the input rate determining means and outputting the reduced handwriting information as required, vector code generating means for extracting a vector component of the handwriting information suitably reduced by the input resolution control means to generate a vector code, succession code generating means for extracting the same values in succession of the handwriting information suitably reduced by the input resolution control means to generate a succession code, and code length control means for receiving the vector code from the vector code generating means and the succession code from the succession code generating means to generate a handwriting code by adjusting and synthesizing code lengths of the vector code and the succession code so as to increase a code length of the succession code when a code length of the vector code is short and shorten the code length of the succession code when the code length of the vector code is long and so as to make the vector code and the succession code a variable-length code with eight bits or an integral multiple of eight bits, and the handwriting code decoding means comprises code separating means for receiving the handwriting code to separate the code into the vector code and the succession code and outputting the codes separately, vector code decoding means for decoding and outputting the vector code obtained by the code separating means, succession code decoding means for decoding and outputting the succession code obtained by the code separating means, output rate determining means for determining, from handwriting information output to the display control means, a rate of the corresponding handwriting input, and output resolution control means for receiving input of decoded handwriting information from the vector code decoding means and the succession code decoding means to suitably expand the handwriting information according to determination results obtained by the output rate determining means and output the obtained information.

In another preferred construction, the processing means has a further function of giving instructions to modify a coding method of the handwriting coding means based on processing results, when modifying a coding method in response to the instruction from the processing means, the handwriting coding means inserts a control code indicating that the coding method is changed into the handwriting code and outputs the obtained handwriting code, when the control code is inserted in the handwriting code, the processing means inserts the control code into the handwriting code for display and outputs the obtained handwriting code, and upon reception of the control code inserted in the handwriting code for display, the handwriting code decoding means modifies a method of decoding the handwriting code for display according to the control code.

In another preferred construction, the input control means outputs, as the handwriting information, an acceleration vector which is a difference vector of rate vectors linking two coordinate points among successive input coordinate points, and the handwriting code decoding means outputs, as the handwriting information for display, an acceleration vector corresponding to the acceleration vector output from the input control means.

In another preferred construction, the handwriting code processing device further comprises communication means for communicating with other handwriting code processing device, wherein the processing means has a further function of modifying characteristics information held by the setting register based on results of communication with other handwriting code processing device connected through the communication means as required.

In another preferred construction, the handwriting code processing device further comprises communication means for communicating with other handwriting code processing device, wherein the processing means has a further function of instructing the handwriting coding means to modify a coding method and modifying characteristics information held by the setting register based on results of communication with other handwriting code processing device connected through the communication means as required, when modifying a coding method in response to the instruction from the processing means, the handwriting coding means inserts a control code indicating that the coding method is changed into the handwriting code and outputs the obtained handwriting code, when the control code is inserted in the handwriting code, the processing means inserts the control code into the handwriting code for display and outputs the obtained handwriting code, and upon reception of the control code inserted in the handwriting code for display, the handwriting code decoding means modifies a method of decoding the handwriting code for display according to the control code.

According to the third aspect of the invention, a handwriting code processing method of processing handwriting input data at a handwriting input device which electronically realizes operability of writing utensils that paper and a pen produce by combining display means for displaying two-dimensional image and handwriting input means for detecting user's handwriting operation to obtain coordinate data corresponding to screen coordinates of the display means, comprising the steps of converting coordinate data detected by the handwriting input means into handwriting information independent of hardware according to information about hardware characteristics of the display means and the handwriting input means, generating and outputting a handwriting code subjected to compressed-coding according to characteristics of the handwriting information generated at the handwriting information generating step, conducting data processing with respect to the handwriting code subjected to compressed-coding at the coding step to generate and output a handwriting code for display subjected to compressed-coding to be displayed on the display means according to processing results, decoding the handwriting code for display generated at the handwriting code for display generating step to generate and output handwriting information for display, and generating a display screen from the handwriting information for display decoded at the handwriting code decoding step and causing the display means to display the display screen according to characteristics information held by the setting register.

In the preferred construction, the coding step comprises the steps of extracting a vector component of the handwriting information to generate a vector code, extracting the same values in succession of the handwriting information to generate a succession code, and using and synthesizing the vector code and the succession code generated by adjusting code lengths of the vector code and the succession code so as to have data of the size of a predetermined number of fundamental bits or a multiple of the number to generate a handwriting code, and the handwriting code decoding step comprises the steps of separating the handwriting code into the vector code and the succession code and outputting the codes separately, decoding and outputting the vector code obtained, and decoding and outputting the succession code obtained.

In another preferred construction, the coding step comprises the steps of determining an input rate of handwriting operation from the handwriting information, reducing the handwriting information based on determination results of the input rate and outputting the obtained handwriting information as required, extracting a vector component of the handwriting information suitably reduced to generate a vector code, extracting the same values in succession of the handwriting information suitably reduced to generate a succession code, and using and synthesizing the vector code and the succession code generated by adjusting code lengths of the vector code and the succession code so as to have data of the size of a predetermined number of fundamental bits or a multiple of the number to generate a handwriting code, and the handwriting code decoding step comprises the steps of separating the handwriting code into the vector code and the succession code and outputting the codes separately, decoding and outputting the vector code obtained, decoding and outputting the succession code obtained, and from the vector code and the succession code decoded, determining a rate of the corresponding handwriting input, as well as suitably expanding and outputting the handwriting information according to determination results.

In another preferred construction, the coding step comprises the steps of extracting a vector component of the handwriting information to generate a vector code, extracting the same values in succession of the handwriting information to generate a succession code, and using and synthesizing the vector code and the succession code generated by adjusting code lengths of the vector code and the succession code so as to increase the code length of the succession code when the code length of the vector code is short and shorten the code length of the succession code when the code length of the vector code is long and so as to make the vector code and the succession code a variable-length code with eight bits or an integral multiple of eight bits to generate a handwriting code, and the handwriting code decoding step comprises the steps of separating the handwriting code into the vector code and the succession code and outputting the codes separately, decoding and outputting the vector code obtained, and decoding and outputting the succession code obtained.

In another preferred construction, the coding step comprises the steps of determining an input rate of handwriting operation from the handwriting information, reducing the handwriting information based on determination results of the input rate and outputting the obtained handwriting information as required, extracting a vector component of the handwriting information suitably reduced to generate a vector code, extracting the same values in succession of the handwriting information suitably reduced to generate a succession code, and using and synthesizing the vector code and the succession code generated by adjusting code lengths of the vector code and the succession code so as to increase the code length of the succession code when the code length of the vector code is short and shorten the code length of the succession code when the code length of the vector code is long and so as to make the vector code and the succession code a variable-length code with eight bits or an integral multiple of eight bits to generate a handwriting code, and the handwriting code decoding step comprises the steps of separating the handwriting code into the vector code and the succession code and outputting the codes separately, decoding and outputting the vector code obtained, decoding and outputting the succession code obtained, and from the vector code and the succession code decoded, determining a rate of the corresponding handwriting input, as well as suitably expanding and outputting the handwriting information according to determination results.

According to another aspect of the invention, a computer readable memory storing a control program for processing handwriting input data by controlling a handwriting input device which electronically realizes operability of writing utensils that paper and a pen produce by combining display means for displaying two-dimensional image and handwriting input means for detecting user's handwriting operation to obtain coordinate data corresponding to screen coordinates of the display means, the control program comprising the steps of converting coordinate data detected by the handwriting input means into handwriting information independent of hardware according to information about hardware characteristics of the display means and the handwriting input means, generating and outputting a handwriting code subjected to compressed-coding according to characteristics of the handwriting information generated at the handwriting information generating step, conducting data processing with respect to the handwriting code subjected to compressed-coding at the coding step to generate and output a handwriting code for display subjected to compressed-coding to be displayed on the display means according to processing results, decoding the handwriting code for display generated at the handwriting code for display generating step to generate and output handwriting information for display, and generating a display screen from the handwriting information for display decoded at the handwriting code decoding step and causing the display means to display the display screen according to characteristics information held by the setting register.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 7 is a diagram showing an example of handwriting information corresponding to the coordinate data illustrated in FIG. 6;

FIG. 8 is a diagram showing an example of structure of a handwriting code in the present embodiment;

FIG. 11 is a diagram showing an example of a handwriting code corresponding to the handwriting information illustrated in FIG. 7;

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
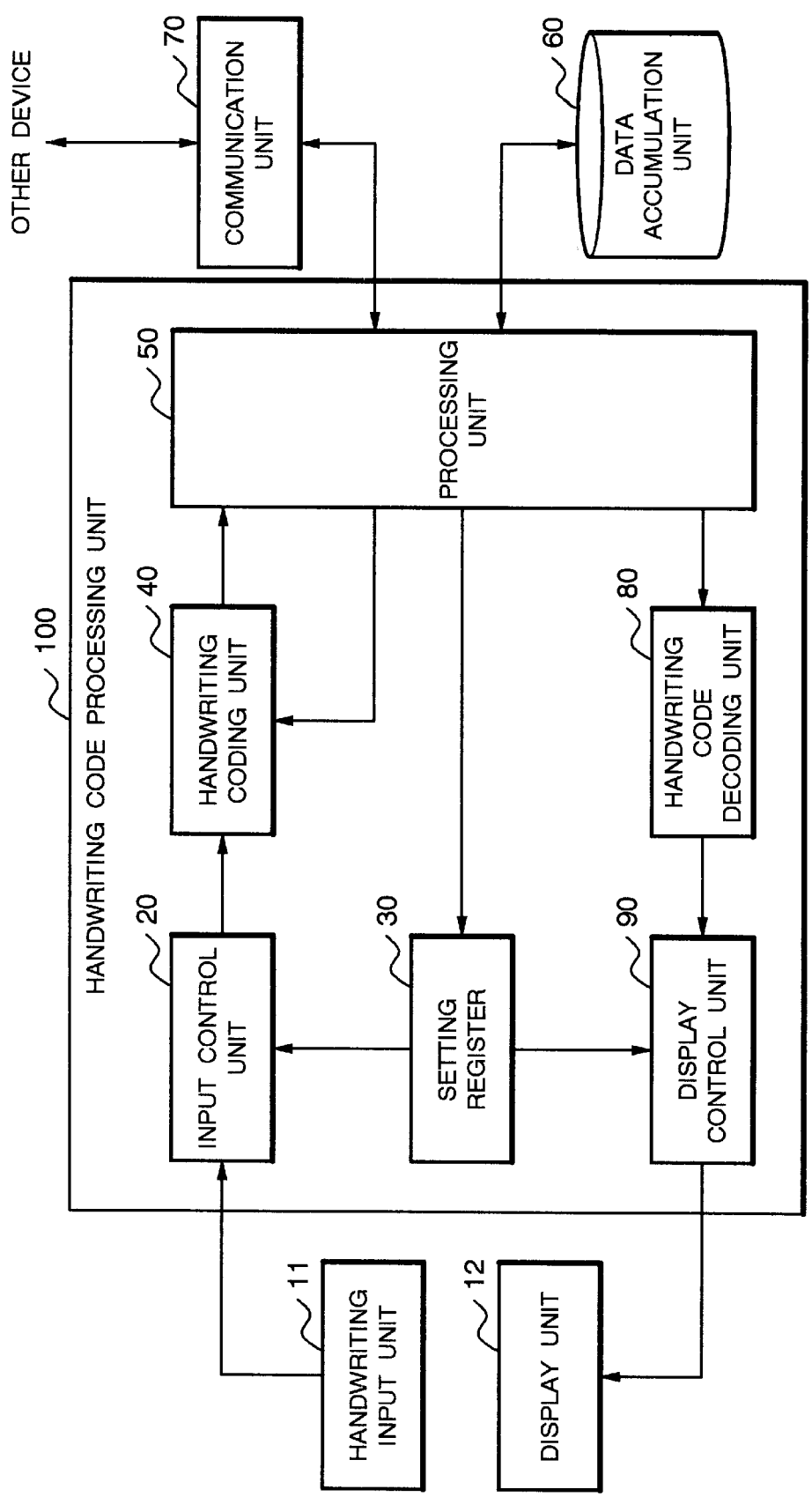
FIG. 1 is a block diagram showing structure of a handwriting input display device equipped with a handwriting code processing device according to one embodiment of the present invention.

FIG. 1 is a block diagram showing structure of a handwriting input display device equipped with a handwriting code processing device according to one embodiment of the present invention.

With reference to FIG. 1, the handwriting input display device of the present embodiment includes a handwriting input unit 11 for receiving input by user's handwriting operation, a display unit 12 for outputting for displaying input results, an input control unit 20, a setting register 30, a handwriting coding unit 40, a processing unit 50, a handwriting code decoding unit 80 and a display control unit 90 which constitute a handwriting code processing device 100 for processing a handwriting code applied through the handwriting input unit 11 to cause the display unit 12 to display the processed code, a data accumulation unit 60 for accumulating handwriting code data as required, and a communication unit 70 for sending and receiving handwriting code data to/from other devices. In FIG. 1, illustration is made only of a characteristic part of the present embodiment and that of the remaining common part is omitted.

In the above-described structure, the display unit 12, which is implemented by a display device such as a liquid crystal display (LCD), conducts two-dimensional displaying.

The handwriting input unit 11, which is implemented, for example, by a touch panel physically provided on a display screen of the display unit 12, detects input by user's handwriting operation to output coordinate data corresponding to screen coordinates of the display unit 12.

The accumulation unit 60, which is implemented, for example, by a magnetic disk device, accumulates code data processed at the handwriting code processing device 100. The communication unit 70, which is implemented by various I/O ports, conducts data communication with other handwriting code processing devices.

The handwriting code processing device 100 is implemented, for example, by program-controlled CPU and internal memory such as a RAM. The control program, which is stored in a common storage medium such as a magnetic disk, an optical disk, or a semiconductor memory for provision, is loaded into the internal memory to control the CPU, thereby realizing a function of each of the above-described components constituting the handwriting code processing device 100.

In the handwriting code processing device 100, the setting register 30 holds hardware characteristics information such as a display resolution of the display unit 12 and a detection precision of the handwriting input unit 11.

The input control unit 20 converts coordinate data as output of the handwriting input unit 11 into handwriting information independent of hardware characteristics and outputs the information according to characteristic information held by the setting register 30.

The handwriting coding unit 40 receives handwriting information output from the input control unit 20 to conduct compressed-coding according to characteristics of handwriting input and outputs obtained handwriting codes.

The processing unit 50 receives a handwriting code output from the handwriting coding unit 40 and conducts predetermined processing corresponding to the received code to output a handwriting code for display to be displayed on the display unit 12 according to the processing results. According to processing results and results of communication with other handwriting code processing devices conducted through the communication unit 70, the processing unit 50 also accumulates handwriting codes at the accumulation unit 60, modifies characteristics information held in the setting register 30, gives an instruction to modify a coding method to the handwriting coding unit 40 and sends and receives handwriting codes to/from other handwriting code processing device through the communication unit 70.

The handwriting code decoding unit 80 receives a handwriting code for display output from the processing unit 50 and decodes the same, and outputs obtained handwriting information.

The display control unit 90 receives handwriting information output from the handwriting code decoding unit 80 to generate a display screen suited for the display unit 12 according to characteristics information held at the setting register 30 and outputs the screen onto the display unit 12.

With reference to FIGS. 2 to 5, more detailed description will be made of the input control unit 20, the handwriting coding unit 40, the handwriting code decoding unit 80 and the display control unit 90.

Figure 2:
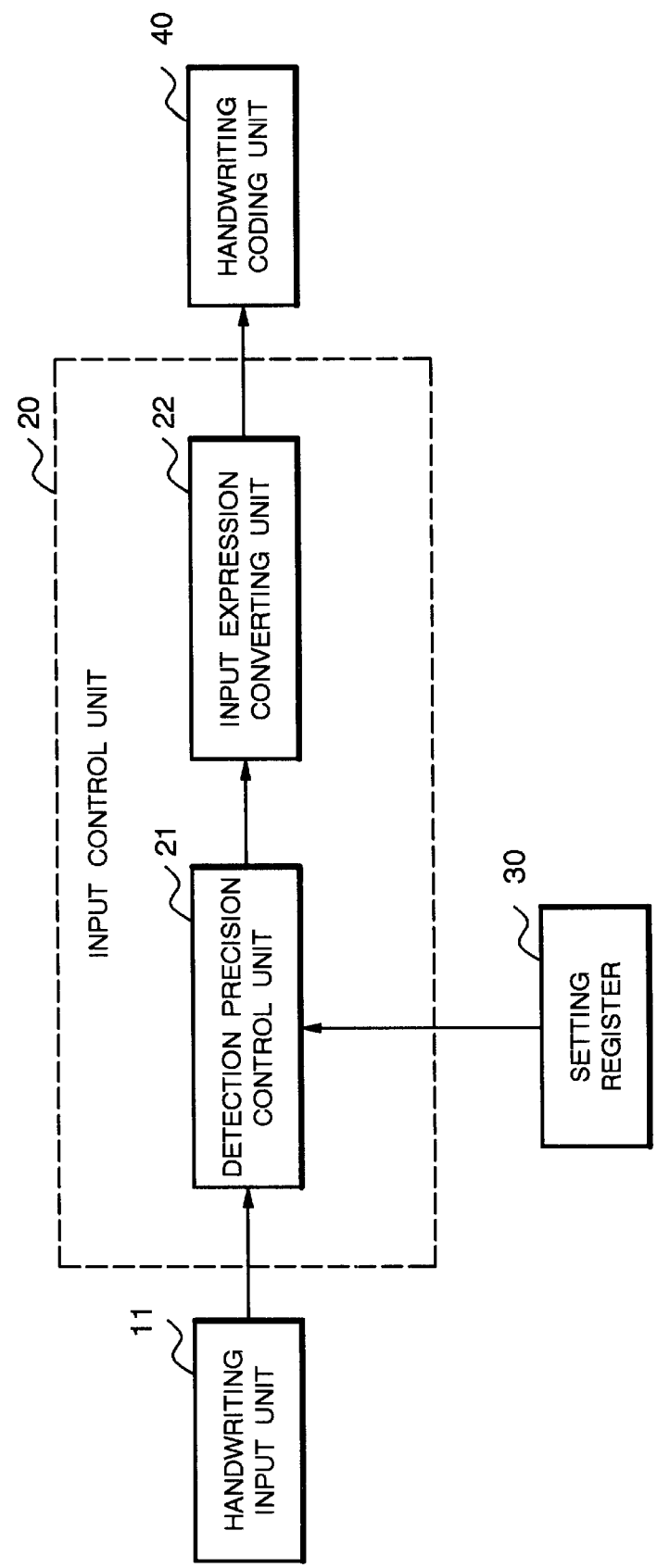
FIG. 2 is a block diagram showing structure of an input control unit in the present embodiment.

With reference to FIG. 2, the input control unit 20 includes a detection precision control unit 21 and an input expression converting unit 22.

The detection precision control unit 21 changes a precision of coordinate data as output of the handwriting input unit 11 according to characteristics information held at the setting register 30 to generate coordinate data independent of hardware characteristics.

The input expression converting unit 22 receives coordinate data from the detection precision control unit 21 to generate an acceleration vector which is a difference vector of rate vectors linking two adjacent coordinate points and outputs the obtained acceleration vector as handwriting information to the handwriting coding unit 40.

Figure 3:
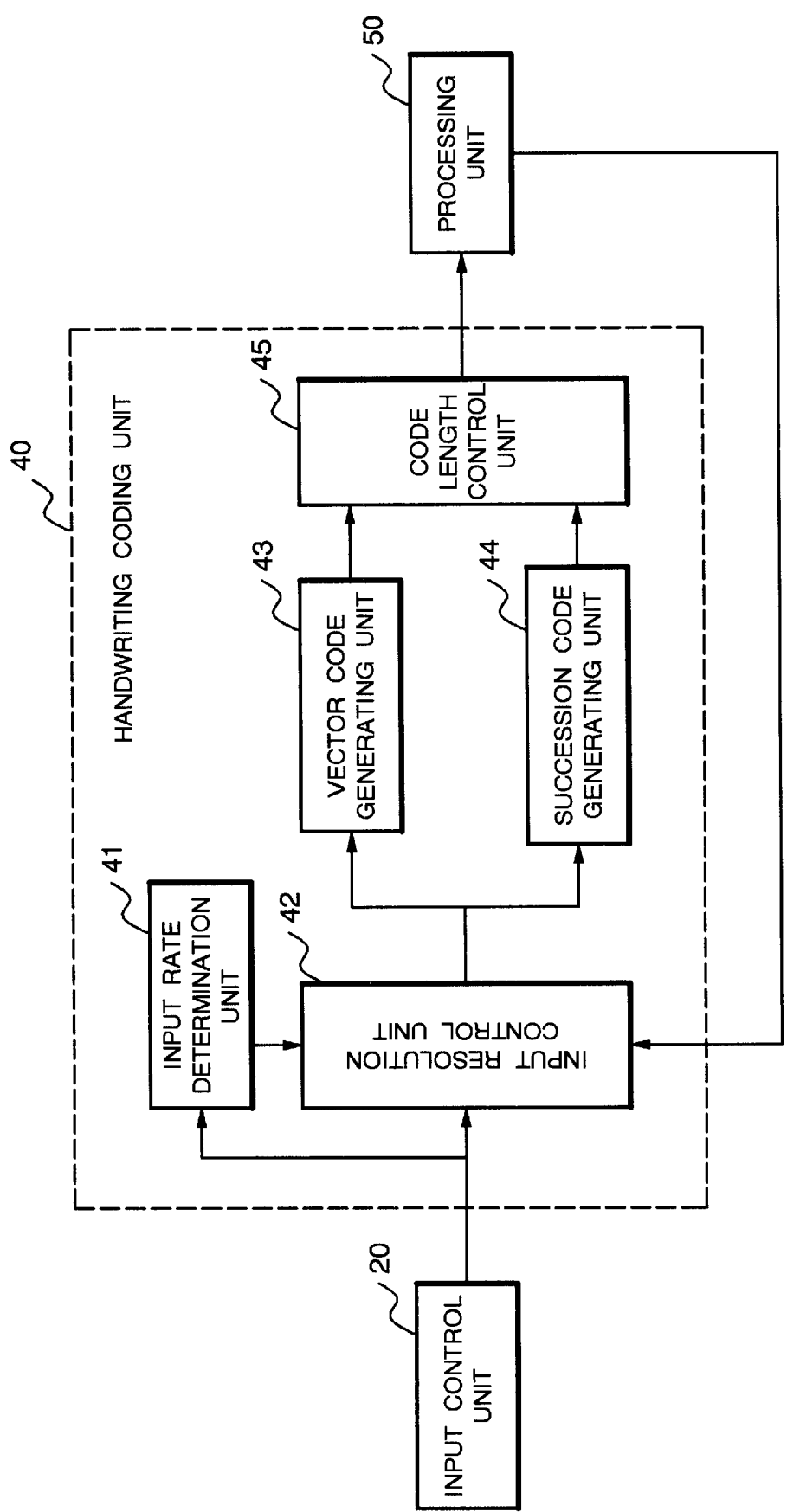
FIG. 3 is a block diagram showing structure of a handwriting coding unit in the present embodiment.

Next, with reference to FIG. 3, the handwriting coding unit 40 includes an input rate determination unit 41, an input resolution control unit 42, a vector code generating unit 43, a succession code generating unit 44 and a code length control unit 45.

The input rate determination unit 41 receives handwriting information as output of the input control unit 20 to determine a rate of user's handwriting input.

The input resolution control unit 42 reduces a vector value of handwriting information received from the input control unit 20 according to determination results obtained by the input rate determination unit 41 and outputs the obtained information.

The input resolution control unit 42 is also allowed to reduce handwriting information independently of determination results obtained by the input rate determination unit 41 according to instructions from the processing unit 50. For reducing handwriting information in response to the instructions from the processing unit 50, the unit 42 inserts a control code indicative of the change of a reduction ratio before a handwriting code to be output and outputs the obtained code.

The vector code generating unit 43 receives handwriting information from the input resolution control unit 42 to generate and output a vector code corresponding to the received handwriting information.

The succession code generating unit 44 receives handwriting information from the input resolution control unit 42 to detect a state of successions of the same vector value and outputs the number of successions as a succession code.

The code length control unit 45 receives a succession code from the succession code generating unit 44 and a vector code from the vector code generating unit 43, synthesizes the succession code and the vector code to generate a composite code of a predetermined number of fundamental bits or of a length of an integral multiple of the number of fundamental bits and outputs the composite code as a handwriting code to the processing unit 50.

Figure 4:
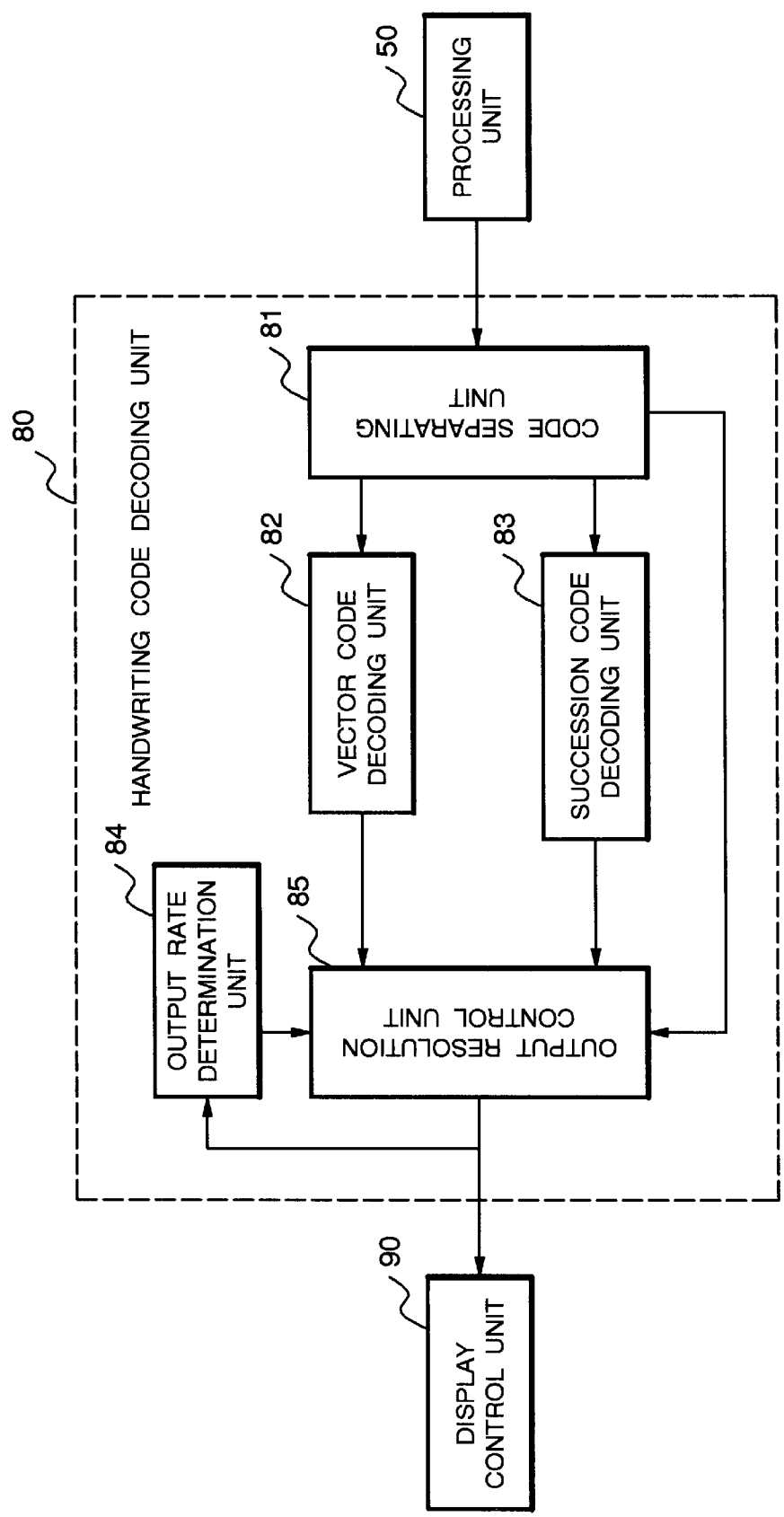
FIG. 4 is a block diagram showing structure of a handwriting code decoding unit in the present embodiment.

Next, with reference to FIG. 4, the handwriting code decoding unit 80 includes a code separating unit 81, a vector code decoding unit 82, a succession code decoding unit 83, an output rate determination unit 84 and an output resolution control unit 85.

The code separating unit 81 receives, from the processing unit 50, a handwriting code for display to be decoded, separates the handwriting code for display into a vector code and a succession code and outputs the codes separately.

When a handwriting code for display received from the processing unit 50 contains a control code which is inserted by the input resolution control unit 42 of the handwriting coding unit 40 to indicate that a reduction ratio is modified independently of rate information, the code separating unit 81 instructs the output resolution control unit 85 to modify an enlargement ratio.

The vector code decoding unit 82 receives a vector code from the code separating unit 81, converts the received vector code into a vector of handwriting information and outputs the vector.

The succession code decoding unit 83 receives a succession code from the code separating unit 81, converts the received succession code into a number of successions and output the number.

The output rate determination unit 84 determines, based on handwriting information output from the output resolution control unit 85 to the display control unit 90, a rate of the corresponding handwriting input.

The output resolution control unit 85 receives a vector of handwriting information from the vector code decoding unit 82 and the number of successions from the succession code decoding unit 83. Then, the unit 85 magnifies the vector according to the determination results obtained by the output rate determination unit 84, as well as repeating the vector as many times as the number of successions to generate handwriting information, and outputs the generated handwriting information to the display control unit 90.

Figure 5:
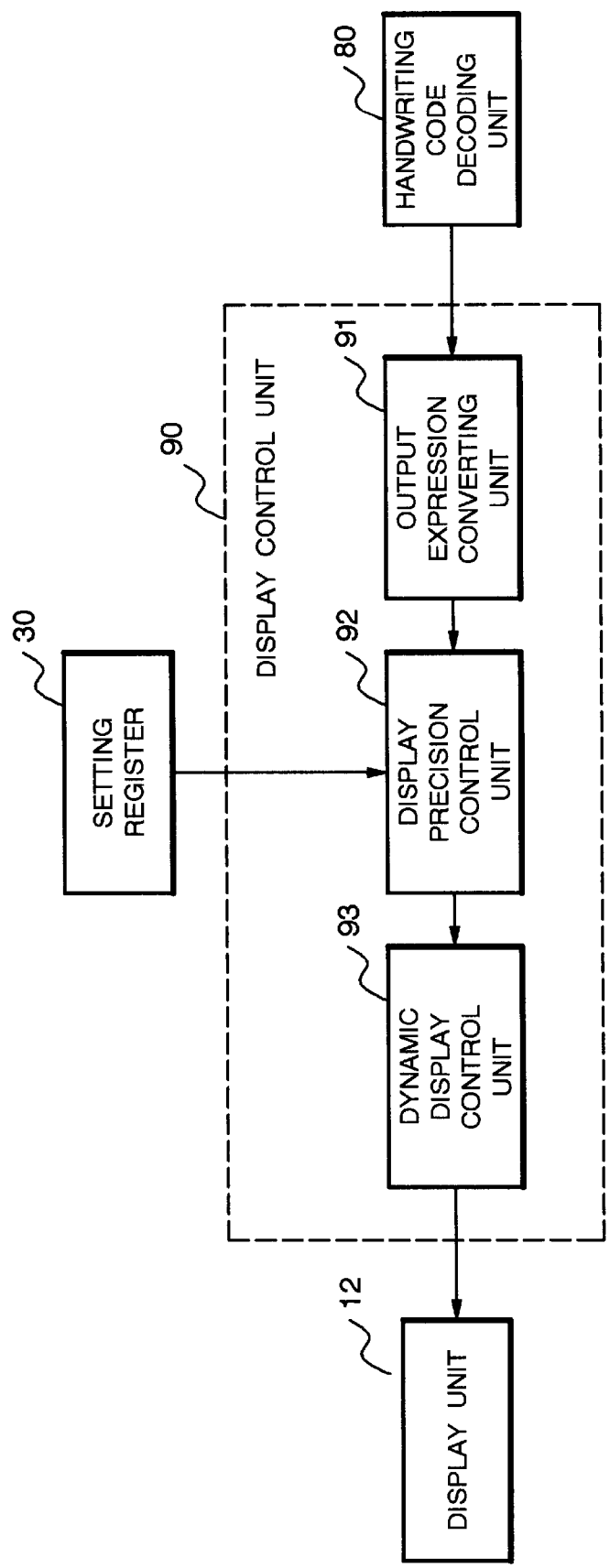
FIG. 5 is a block diagram showing structure of a display control unit in the present embodiment.

Next, with reference to FIG. 5, the display control unit 90 includes an output expression converting unit 91, a display precision control unit 92 and a dynamic display control unit 93.

The output expression converting unit 91 receives handwriting information expressed in an acceleration vector from the handwriting code decoding unit 80, converts the information into coordinate data and outputs the obtained data.

The display precision control unit 92 receives coordinate data from the output expression converting unit 91 and converts the received data into coordinate data suited for the display unit 12 according to characteristics information held at the setting register 30. Coordinate data conversion can be realized by expanding or reducing coordinate data received from the output expression converting unit 91 or by the processing of forming a smooth hand-written line drawing by the interpolation between coordinate points according to characteristics of handwriting input as disclosed in Japanese Patent Laying-Open No. 9-190275.

The dynamic display control unit 93 receives coordinate data from the display precision control unit 92 to generate a dynamic display screen based on the coordinate data and outputs the display screen onto the display unit 12. On a dynamic display screen, display effects according to characteristics of handwriting input can be realized such as the pen strokes reproduction processing disclosed in Japanese Patent Laying-Open (Kokai) No. Heisei 9-258885 by which handwriting display is made at the same rate as that of handwriting input.

Japanese Patent Laying-Open No. 9-25885 recites a handwriting input display device which reproduces, by a handwriting representation means having a continuity control means and a polarity control means, a natural handwriting reproducing shades of a handwriting and a change of a line width, and smoothness of linkage and rounds and reproduces a handwriting equivalent to that on actual paper without losing characteristics of handwritings of individual users even when an input pen and a writing utensil corresponding to a handwriting to be reproduced differ from each other in characteristics.

Next, detailed description will be made of the contents of processing of each component according to the present embodiment with reference to the drawings.

Figure 6:
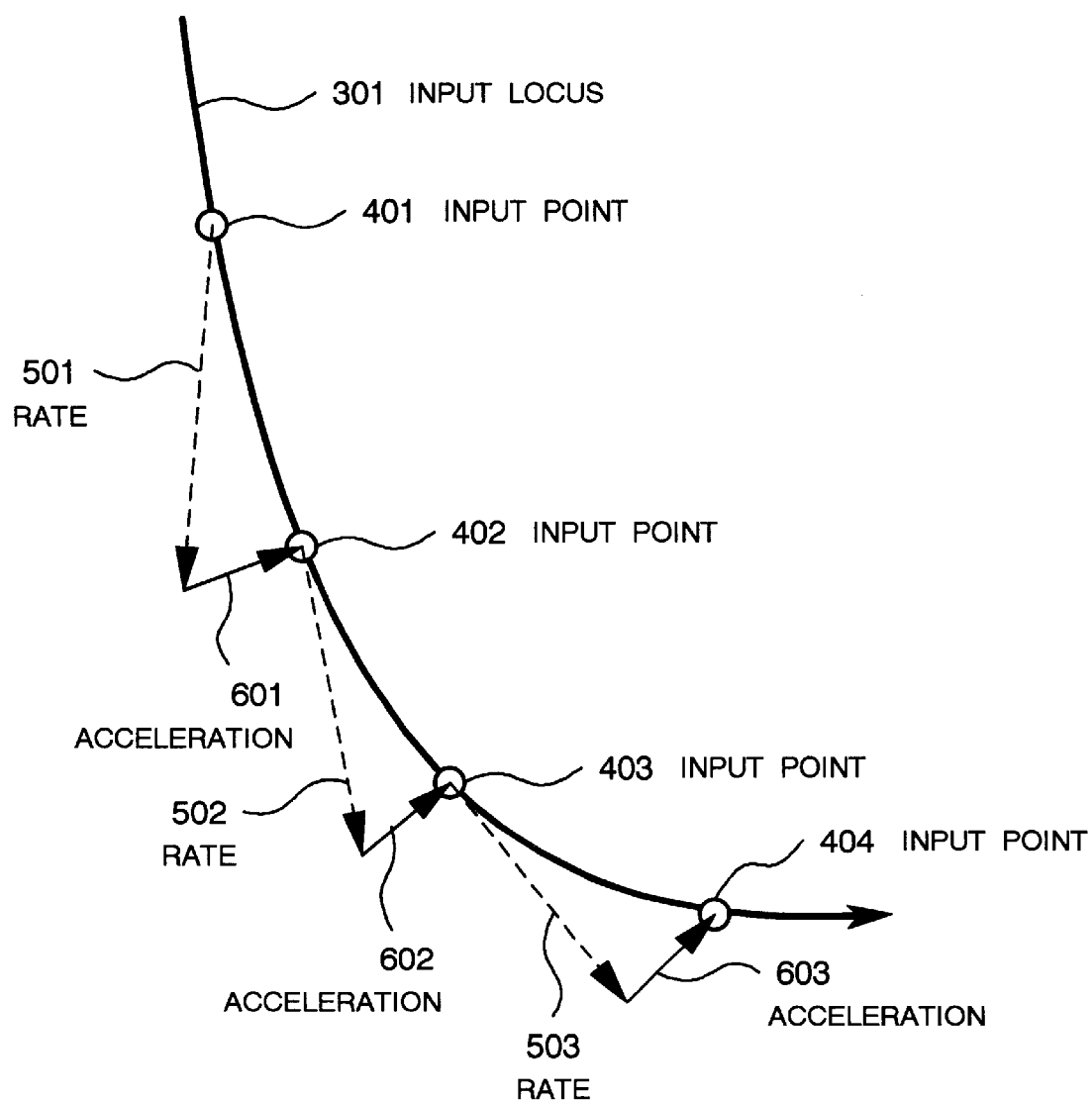
FIG. 6 is a diagram showing an example of coordinate data for use in explaining operation of the present embodiment.

FIG. 6 shows an example of coordinate data of an input locus applied by handwriting at the handwriting input unit 11. In FIG. 6, an input locus 301 is a locus of user's handwriting input on the display screen of the display unit 12. Input points 401, 402, 403 and 404 represent coordinate data detected by the handwriting input unit 11 with respect to input (input locus 301) made in the indicated order. Rates 501, 502 and 503 represent rate vectors of handwriting input corresponding to the input points 401, 402 and 403, respectively. The rate 502, for example, is a difference vector between the input point 402 and the input point 401 immediately preceding the point 402. Accelerations 601, 602 and 603 represent acceleration vectors of handwriting input corresponding to the input points 401, 402 and 403, respectively. The acceleration 601, for example, represents a difference vector between the rate 502 and the rate 501.

FIG. 7 shows an example of handwriting information corresponding to coordinate data illustrated in FIG. 6 which is output from the input control unit 20. As illustrated in FIG. 7, handwriting information output from the input control unit 20 is expressed as a sequence of acceleration vectors for the respective input points shown in FIG. 6. Upon detection of the input points 402, 403 and 404, the input control unit 20 outputs a sequence of vectors of the accelerations 601, 602 and 603 as handwriting information.

FIG. 8 shows an example of structure of a handwriting code to be output from the handwriting coding unit 40. With eight bits as a fundamental unit, the code length control unit 45 of the handwriting coding unit 40 generates a 8-bit code or a code with a code length as a multiple of eight bits as illustrated in FIG. 8. The value "1" of bit 7, the highest-order bit of each fundamental unit, denotes that subsequent eight bits exist and the value "0" of bit 7 denotes that no subsequent eight bits exist. As illustrated in FIG. 8, when as many data as a number (n−1) whose bit 7 has the value of "1" succeed one after another and then data whose bit 7 has the value of "0" follows, the code length will be n x eight bits (n byte).

Figure 9:
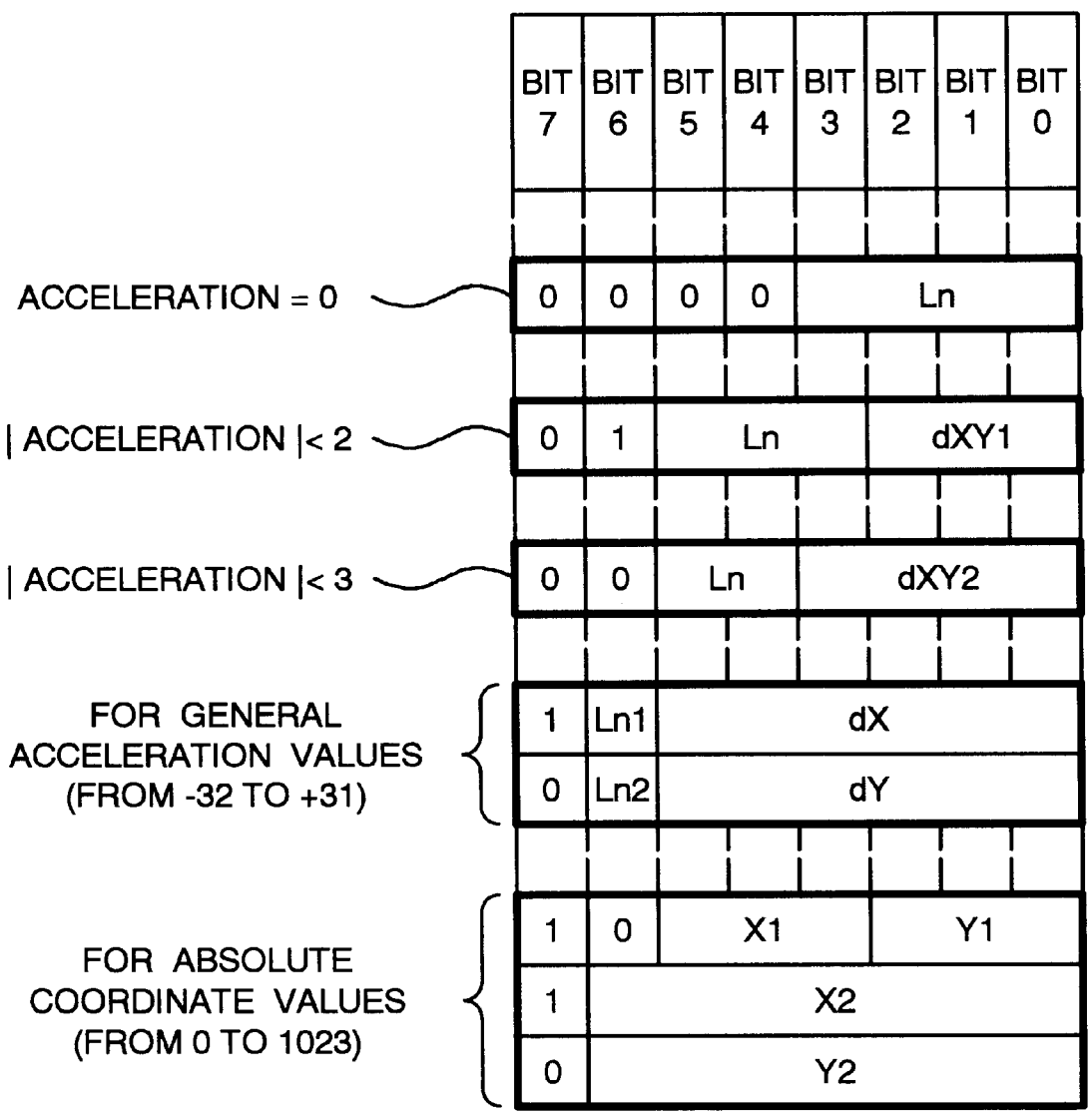
FIG. 9 is a diagram showing an example of a system of handwriting codes employing the structure illustrated in FIG. 8.
Figure 10A:
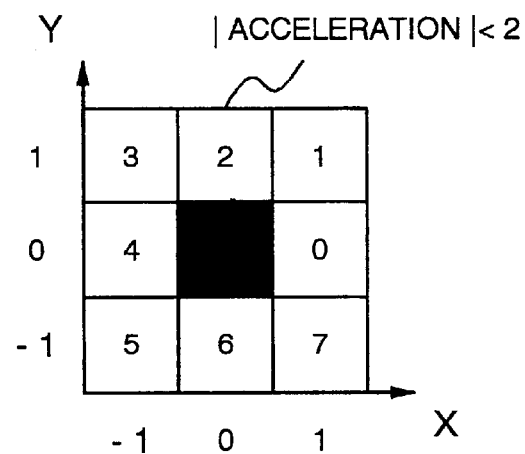
FIGS. 10a and 10b are diagrams showing an example of a relationship between a vector code and a coordinate point in the handwriting code illustrated in FIG. 9.
Figure 10B:
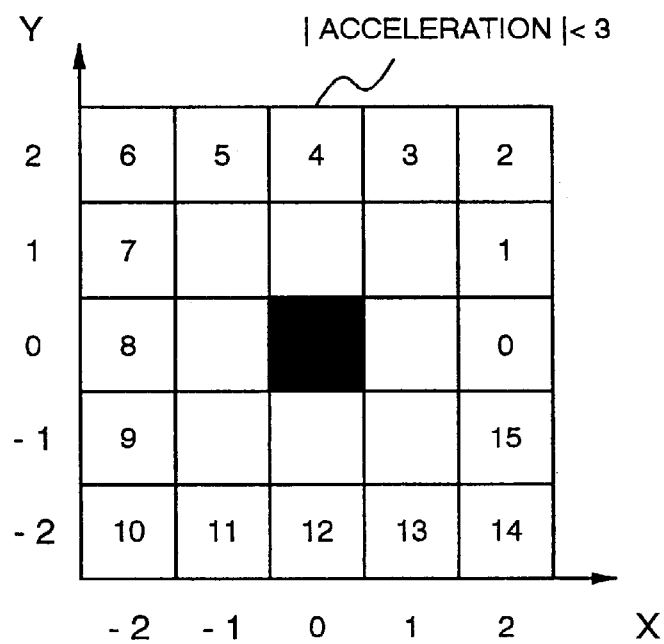

FIG. 9 illustrates a system of handwriting codes having the structure shown in FIG. 8. FIG. 10 shows a relationship between a vector code and a coordinate point in the handwriting codes illustrated in FIG. 9. Coded data (a) to (d) of FIG. 9 are examples of handwriting codes expressed with a variable length, one byte or two bytes, which are to be employed depending on the magnitude of a vector of handwriting information. Coded data (e) is an example of a 3-byte handwriting code for representing coordinate data. Ln represents a succession code, Ln1 represents a higher-order one bit of a succession code in the coded data (d) and Ln2 represents a lower-order one bit of a succession code in the coded data (d). dXY1 represents a vector code in a case where absolute values of the components of a vector X and a vector Y of handwriting information are not more than "2", dXY2 represents a vector code in a case where absolute values of the components of the vector X and the vector Y of handwriting information are not more than "3", and dX and dY represent the components of the vector X and the vector Y of handwriting information in the coded data (d), respectively. X1 and X2 represent higher-order three bits and lower-order seven bits of an X-coordinate value in the coded data (e), respectively, and Y1 and Y2 similarly represent higher-order three bits and lower-order seven bits of a Y-coordinate value in the coded data (e), respectively.

In addition, the coded data (a) is a handwriting code obtained when the components of the vector X and the vector Y are both "0", whose four bits (Ln) from bit 0 to bit 3 express the number of successions from "1" to "15".

The coded data (b) is a handwriting code for use in a case where the components of the vector X and the vector Y range from "−1" to "1" and handwriting information can not be expressed by coded data (a), in which three bits from bit 0 to bit 2 (dXY1) represent eight directions of a vector and three bits from bit 3 to bit 5 represent the number of successions from "1" to "7". The vector code (a) of FIG. 10 illustrates a value of dXY1 and directions of a vector in the coded data (b) of FIG. 9. In the figure, with a center black coordinate point as the origin, codes from "0" to "7" (three bits in binary notation) express a vector. For example, if X=1 and Y=0, then dXY1=0 and if X=1 and Y=1, then dXY1=1.

Similarly, the coded data (c) is a handwriting code for use in a case where the components of the vector X and the vector Y range from "−2" to "2" and handwriting information can be expressed neither by coded data (a) nor the coded data (b), in which dXY2 represents vectors from "0" to "15" (four bits in binary notation) as illustrated in the vector code (b) of FIG. 10 and Ln represents the number of successions from "0" to "3".

The coded data (d) is a handwriting code in a case where handwriting information can be expressed by none of the coded data (a) to (c), in which Ln1 and Ln2 represent the number of successions from "0" to "3" and dX and dY together express a vector whose components of the vector X and the vector Y both range from "−32" to "31".

The coded data (e), differently from the handwriting codes of the coded data (a) to (d) indicative of a difference, is a handwriting code for use in a case where absolute coordinate designation is necessary, for example, for expressing a starting point of a handwriting, in which X1, X2, Y1 and Y2 express a coordinate value whose components of the vector X and the vector Y both range from "0" to "1024".

FIG. 11 shows a handwriting code corresponding to the handwriting information illustrated in FIG. 7. Coded data (a), (b) and (c) shown in FIG. 11 are handwriting codes which express the acceleration 601, the acceleration 602, the acceleration 603 of FIG. 7 in the code system shown in FIGS. 9 and 10. As illustrated in the figure, a total of five bytes are used for expression. For example, the acceleration 601 is a vector whose components of the vector X and the vector Y are both "2" and being applied a handwriting code of the coded data (c) in FIG. 9 and being based on the vector code (b) of FIG. 10, it will be a handwriting code whose vector code dXY2 is 2 (0010 in binary notation) and whose number of successions Ln is 1 (01 in binary notation).

Figure 12A:
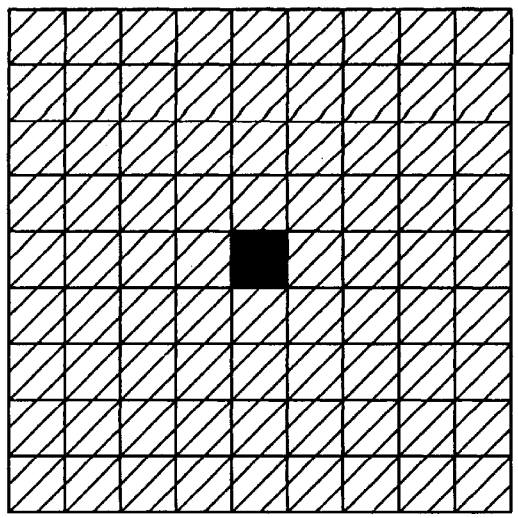
FIGS. 12a 12b and 12c are diagrams for use in explaining a function of an input resolution control unit at the handwriting coding unit in the present embodiment.
Figure 12B:
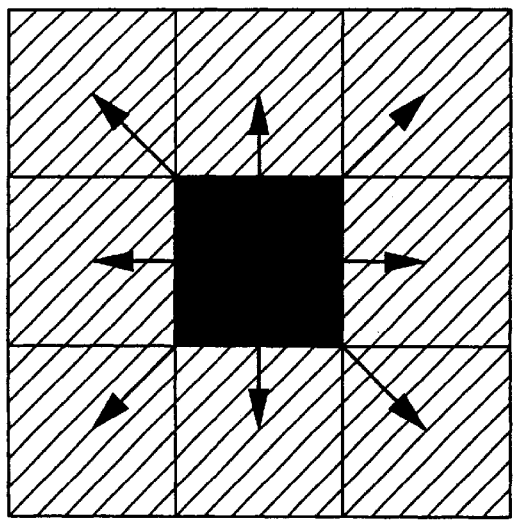
Figure 12C:
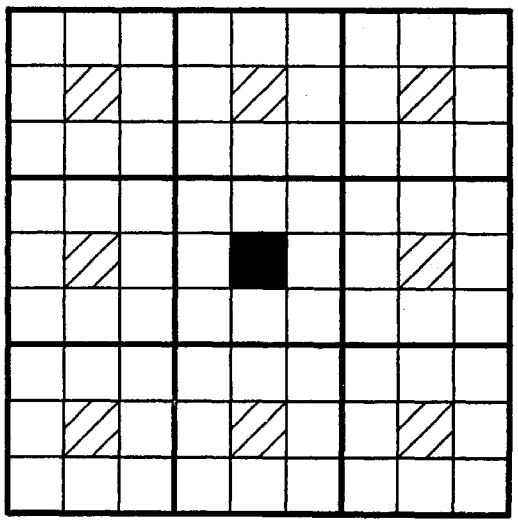

With reference to FIG. 12, the function of the input resolution control unit 42 of the handwriting coding unit 40 will be described. A vector code (a) shown in FIG. 12 indicates kinds of vector codes obtained in a case where the components of the vector X and the vector Y of handwriting information range from "−4" to "4". Vectors with the center black point as a starting point except a vector whose magnitude is "0" need as many codes for distinguishing as the number of surrounding points denoted by slanting lines.

The vector code (b) shows kinds of vector codes obtained in a case where a resolution of the vector code (a) is reduced to one-third, that is, where three points by three points of the vector code (a) are expressed as one point of the vector code (b). For example, vectors of eight directions surrounding the starting point (black point at the center) of the vector code (a) are all expressed as a starting point (black point at the center) in the vector code (b). In addition, while in the vector code (a), 81 vector codes (nine points by nine points) including the starting point exist, reduction of the resolution to one-third will result in expressing 81 vector codes as nine (three points by three points) vector codes including the starting point as illustrated in the vector code (b). Thus, reduction in the number of kinds of vector codes can shorten a code length of a vector code. In addition, since probability of occurrence of the same vector code is increased, compressibility will be increased both by the compression of a variable-length code and the compression of a succession code.

The vector code (c) shows an example obtained by tripling the vector code (b) with a one-third resolution to reproduce a vector of the original resolution illustrated in the vector code (a). The starting point of the vector code (b) is converted into the starting point of the vector code (c) and points denoted by slanting lines in the vector code (b) are converted into points denoted by slanting lines in the vector code (c) with their sizes tripled. All the points in the vector code (a) are expressed by nine vector codes in the vector code (b) and when the vector codes are reproduced to have the original resolution, they can be expressed as a vector whose error is less than two points (the same point or any of eight points surrounding the original point) as illustrated in the vector code (c).

Figure 14:
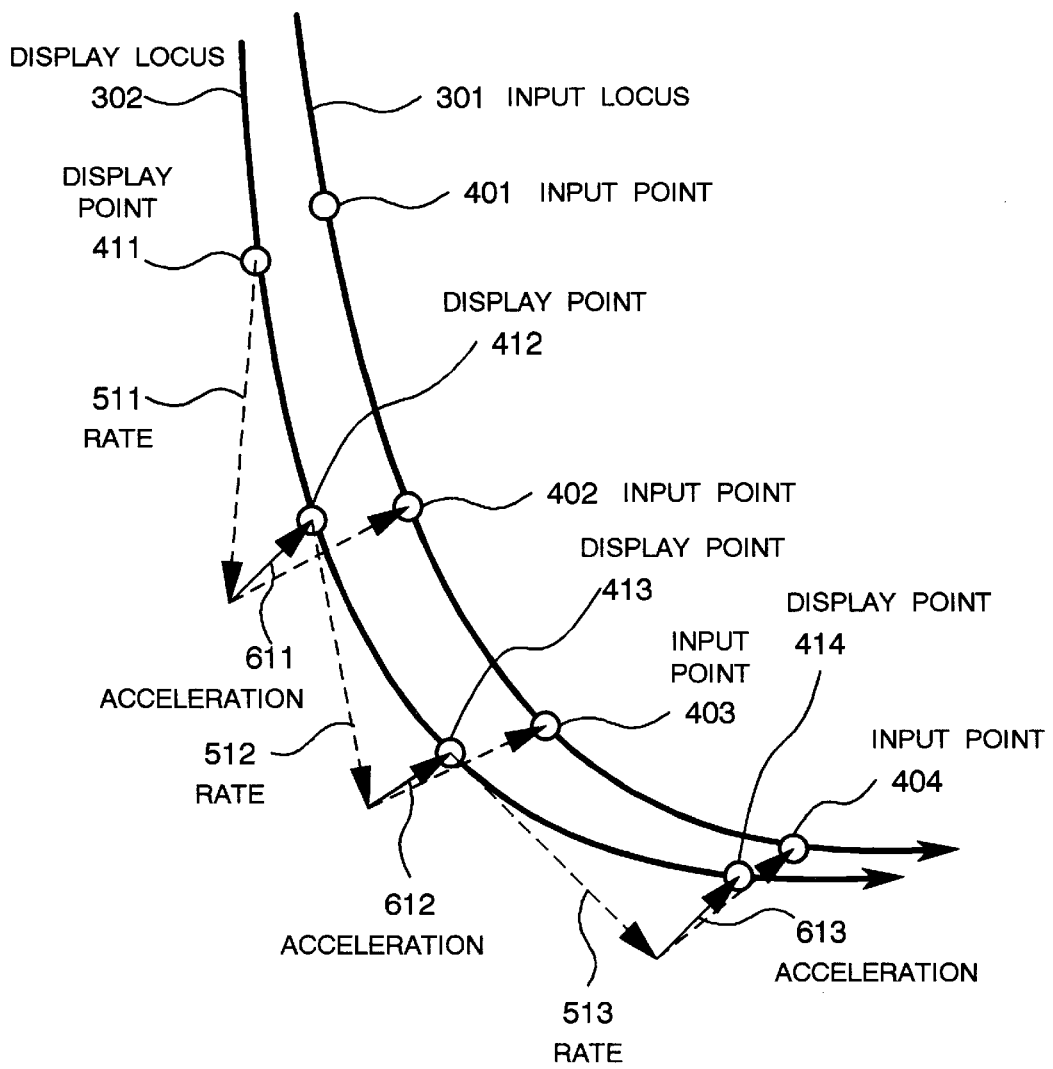
FIG. 14 is a diagram showing an example of a display locus for use in explaining the operation of the present embodiment.

FIG. 14 shows an example of a display handwriting to be displayed on the display unit 12 corresponding to the input locus 301 illustrated in FIG. 6. As has been described with reference to FIG. 6, the handwriting input unit 11 sequentially detects the input points 401, 402, 403 and 404. A display locus 302 is a line drawing displayed on the display unit 12 corresponding to the input locus 301. Display points 411, 412, 413 and 414 on the display locus 302 are coordinate points on the display unit 12 generated by coding corresponding to the input points 401, 402, 403 and 404, respectively. Rates 511, 512 and 513 respectively represent rate vectors of the progress of the displaying of the display locus 302 at the time point when the display points 411, 412 and 413 are displayed. The rate 512, for example, is a difference vector between the display point 412 and the display point 411 immediately preceding the point 412. Accelerations 611, 612 and 613 represent acceleration vectors indicative of the amount of a rate change of the display locus 302 at a time point when the display points 411, 412 and 413 are displayed, respectively. The acceleration 611, for example, represents a difference vector between the rate 512 which is a rate vector at the display point 412 and the rate 511 which is a rate vector at the display point 411 immediately preceding the point 412.

Figure 15:
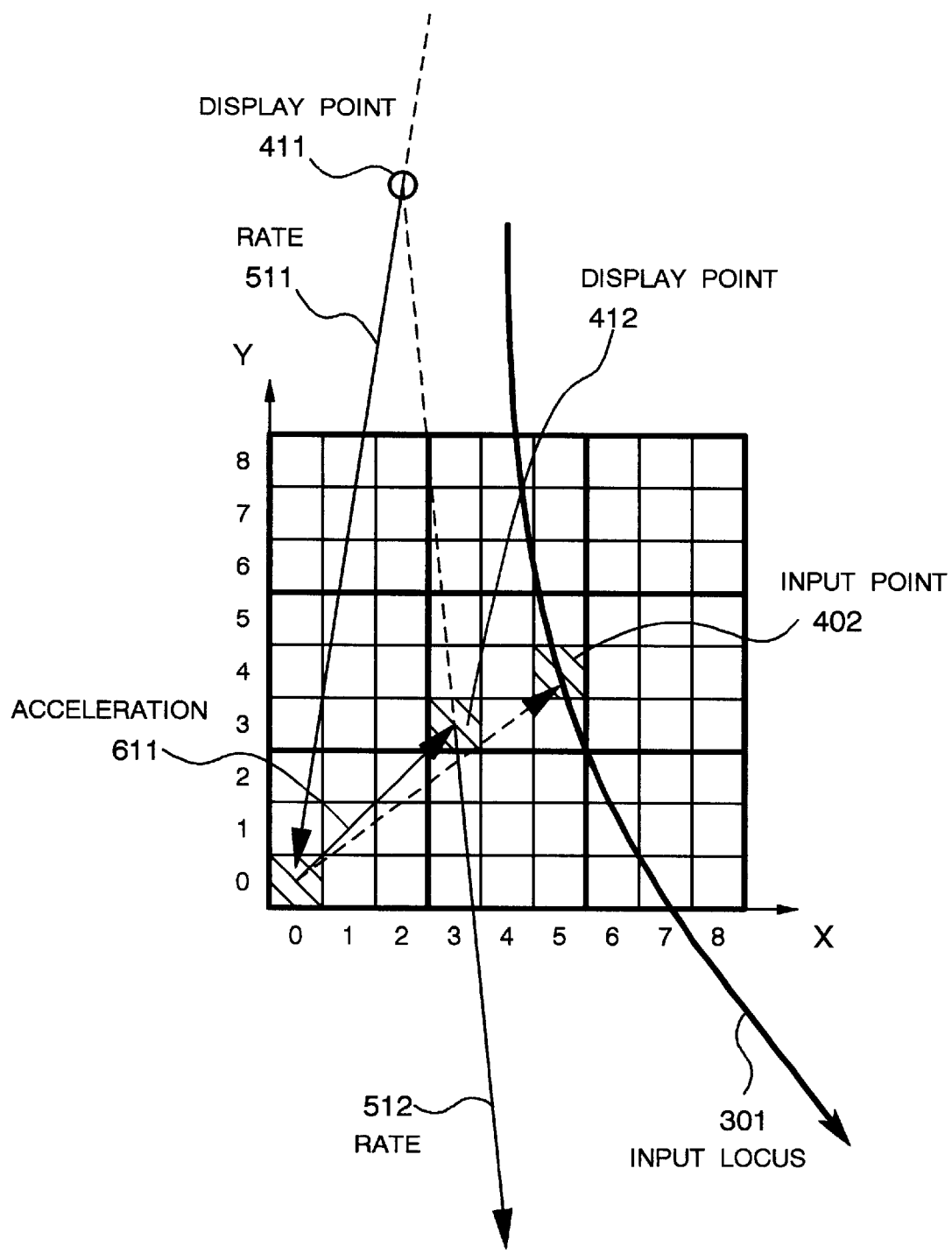
FIG. 15 is a diagram for use in explaining operation of the handwriting coding unit at the detection of an input point 402 shown in FIG. 14.

FIG. 15 shows a state of assignment of a coordinate system with the starting point of the acceleration 611 as the origin to the vicinity of the input point 402 of FIG. 14. With reference to FIG. 15, when the input point 402 is detected after the display point 411 is displayed, the acceleration 611 is generated as a vector ("1" in the X-direction and "1" in the Y-direction in magnitude) expressed with one-third of a resolution (converting a square of three points by three points into one point) of an acceleration vector ("5" in the X-direction and "4" in the Y-direction in magnitude) from the end point of the rate 511 to the input point 402.

Figure 16:
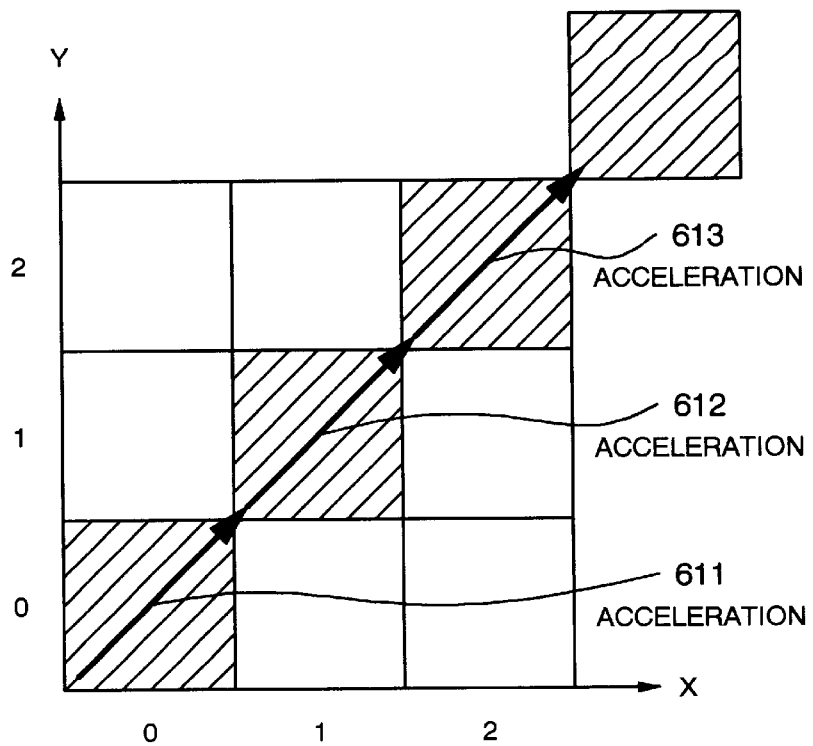
FIG. 16 is a diagram for use in explaining operation of the handwriting coding unit corresponding to an input locus shown in FIG. 14.
Figure 17:
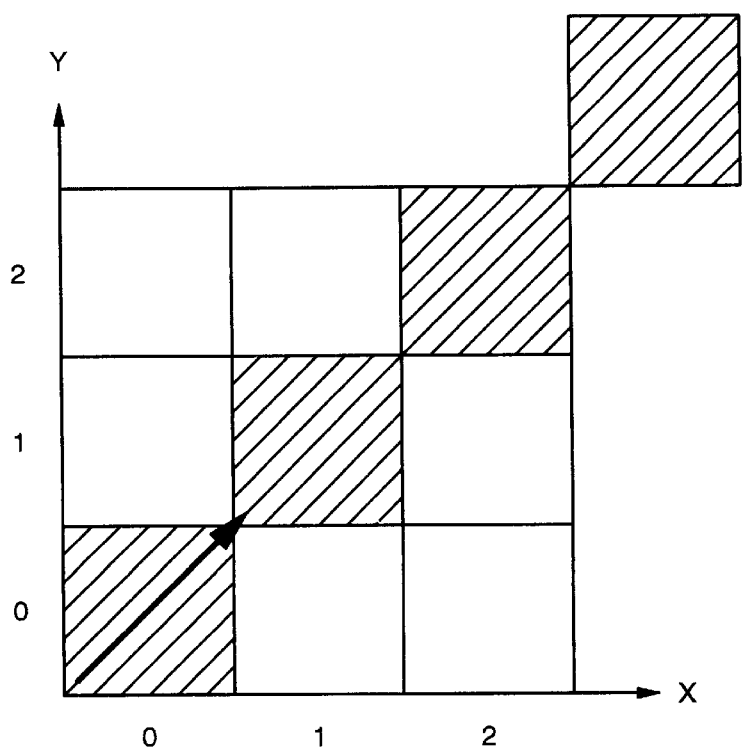
FIG. 17 is a diagram for use in explaining the operation of the handwriting coding unit corresponding to the input locus shown in FIG. 14.
Figure 18:
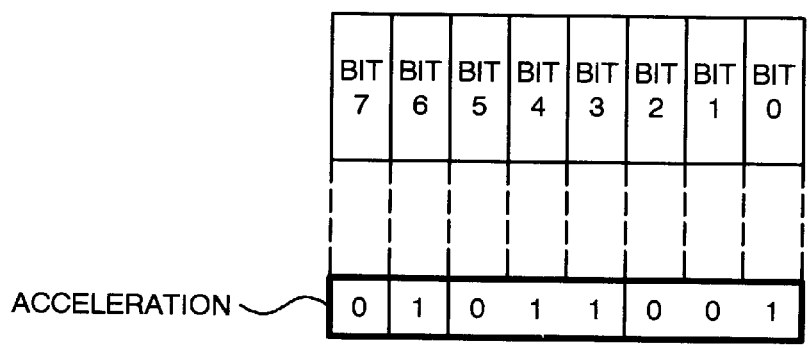
FIG. 18 is a diagram showing an example of a handwriting code corresponding to the handwriting information of FIG. 14.

With reference to FIGS. 16, 17 and 18, description will be made of operation of the handwriting coding unit 40 corresponding to the input locus 301 of FIG. 14. FIG. 16 is a diagram showing a vector code of handwriting information generated by the vector code generating unit 43 corresponding to the display locus 302 of FIG. 14. The vector codes are constituted by using the acceleration 611 illustrated in FIG. 15, and the acceleration 612 and the acceleration 613 generated at the time point when the input points 403 and 404 in FIG. 14 are detected in the same manner as the generation of the acceleration 611. The accelerations 611, 612 and 613 are all expressed as vector codes whose component of the vector X is "1" and component of the vector Y is "1" in magnitude. FIG. 17 is a diagram showing a state where with respect to the vector code illustrated in FIG. 16, after the determination is made by the succession code generating unit 44 that three of the same vector exist in succession, the successive codes are expressed as one vector code by the code length control unit 45. FIG. 18 shows a handwriting code corresponding to the display locus 302 to be output when the vector code of FIG. 17 is generated by the code length control unit 45. The handwriting code is expressed as one-byte handwriting code obtained by inserting the value "1" of dXY1 (001 in binary notation) obtained from the vector code (a) in FIG. 10 and the value "3" of Ln (011 in binary notation) obtained from the output of the code length control unit 45 into the code of the coded data (b) shown in FIG. 9.

Figure 19:
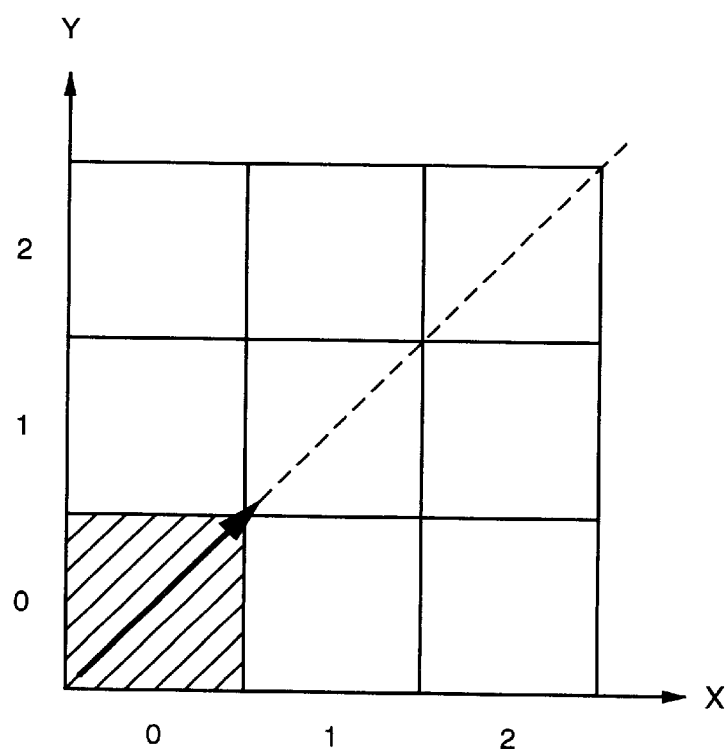
FIG. 19 is a diagram for use in explaining operation of the handwriting code decoding unit corresponding to the handwriting code shown in FIG. 18.
Figure 20:
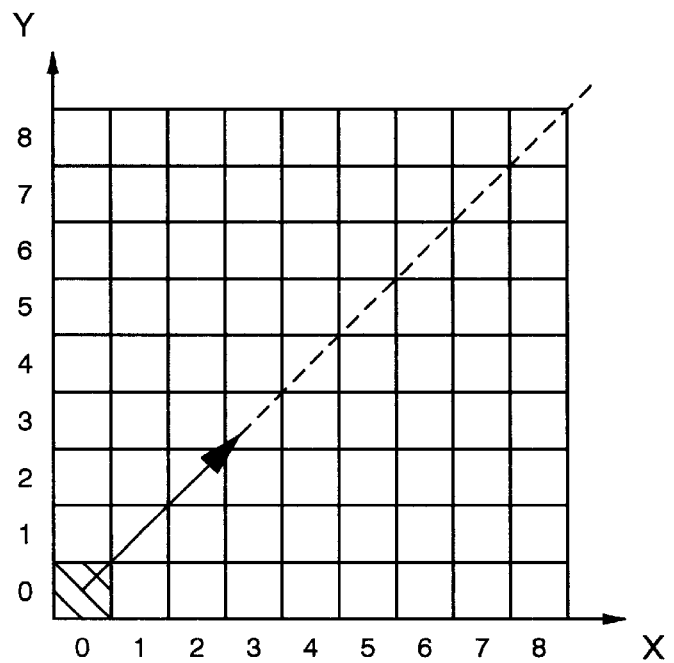
FIG. 20 is a diagram for use in explaining the operation of the handwriting code decoding unit corresponding to the handwriting code shown in FIG. 18.
Figure 21:
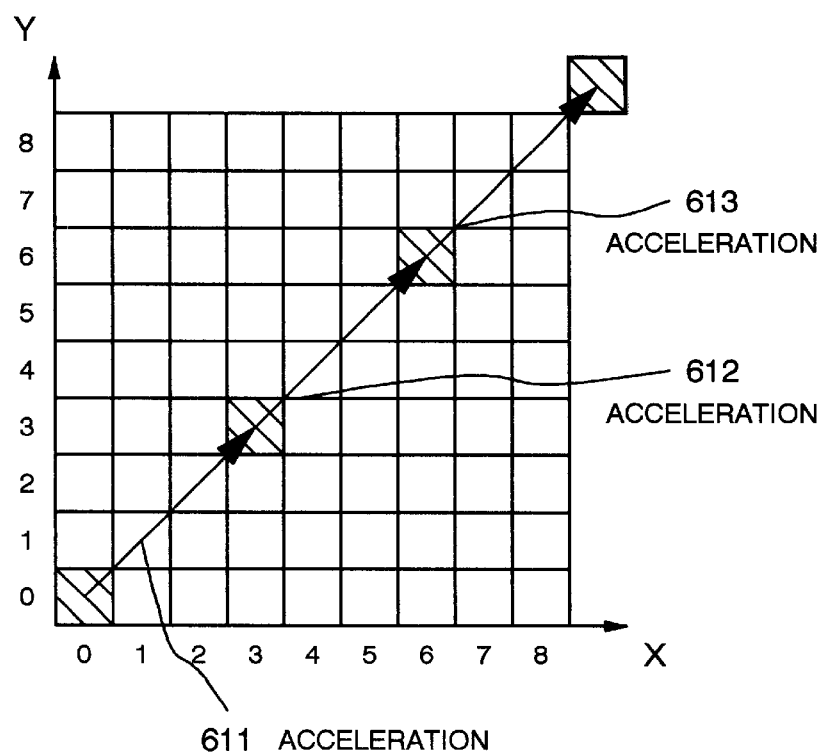
FIG. 21 is a diagram for use in explaining the operation of the handwriting code decoding unit corresponding to the handwriting code shown in FIG. 18.

With reference to FIGS. 19, 20 and 21, description will be made of operation of the handwriting code decoding unit 80 corresponding to the handwriting code of FIG. 18. FIG. 19 shows a vector generated by the vector code decoding unit 82 corresponding to the handwriting code of FIG. 18. FIG. 20 shows a vector obtained by magnifying the vector shown in FIG. 19 to have three times the current output rate by the output resolution control unit 85. FIG. 21 shows three vectors generated from the vector illustrated in FIG. 20 by the output resolution control unit 85 by using the number of successions "3" as the output of the succession code decoding unit 83. The illustrated three vectors correspond to the accelerations 611, 612 and 613 of FIG. 14 and are used as handwriting information for displaying the display points 412, 413 and 414 when the handwriting code decoding unit 80 receives the handwriting code of FIG. 18 after the display point 411 of FIG. 14 is displayed.

Next, a method of generating and displaying handwriting information according to the present embodiment will be described in detail with reference to FIGS. 1, 2, 5, 6 and 7.

When a user conducts handwriting operation on the display screen of the display unit 12 to input the input locus 301 shown in FIG. 6, the handwriting input unit 11 detects the user's handwriting input by, for example, the sampling at fixed intervals to output coordinate data of the input points 401, 402, 403 and 404.

The input control unit 20 receives the coordinate data output from the handwriting input unit 11 to generate handwriting information independent of hardware. More specifically, the detection precision control unit 21 converts a coordinate system of an input point received from the handwriting input unit 11 according to hardware characteristics information held in the setting register 30. Then, the input expression converting unit 22 converts the coordinate data received from the detection precision control unit 21 into an acceleration vector suited for a handwriting code as illustrated in FIG. 7.

Operation of the detection precision control unit 21 will be more specifically described. Assume, for example, that a mean value of a travel speed of the point of a pen when a user inputs a handwriting line drawing is 30 mm per second. Also assume that in the characteristics information held by the setting register 30, coordinate sampling by the handwriting input unit 11 is conducted 100 times per second and a display pixel density of the display unit 12 is six points in 1 mm. In this case, since coordinate detection by the handwriting input unit 11 is executed in one-hundredth second, the travel distance of the point of the pen during the period will be 0.3 mm in average. Since on the display unit 12, two pixels exist for 0.3 mm, a mean value of the magnitude of a rate vector for each input point as indicated by the rates 501, 502 and 503 shown in FIG. 6 will be two points. Similarly, when coordinate detection is conducted in one-fiftieth second, a travel distance will be 0.6 mm and a mean value of the corresponding rate vector will be four points.

Thus, information of handwriting input detected by the handwriting input unit 11 changes with characteristics of a device. Coordinate values detected by devices with different characteristics can not be displayed properly as a result. The detection precision control unit 21 therefore compares characteristics information set as reference in advance and characteristics information held by the setting register 30 to modify a coordinate value so as to meet the detection based on the reference characteristics information. When a reference rate of coordinate detection is one-fiftieth second and a detection rate in the characteristics information held at the setting register 30 is one-hundredth second, for example, the detection precision control unit 21 outputs coordinate data every two points of obtained coordinate data. Similarly, when a display pixel density differs from that of the reference characteristics information, the unit 21 outputs coordinate data in accordance with a unit system of the reference characteristics information.

As to displays of handwriting line drawing, the output expression converting unit 91 at the display control unit 90 receives handwriting information expressed in an acceleration vector and conducts conversion processing reverse to the conversion by the input expression converting unit 22 to output coordinate data. Then, reversely to the conversion by the detection precision control unit 21, the display precision control unit 92 converts coordinate data based on the reference characteristics information into coordinate data suited for displays on the display unit 12 according to the characteristics information held at the setting register 30. Then, the dynamic display control unit 93 receives the coordinate data from the display precision control unit 92 to conduct displaying according to handwriting characteristics. In the processing at the display precision control unit 92 and the dynamic display control unit 93, display effects according to characteristics of handwriting input such as interpolation of coordinate points and reproduction of strokes of a pen can be suitably realized.

As described in the foregoing, having the input control unit 20 for converting coordinate data detected at the handwriting input unit 11 into handwriting information independent of hardware according to characteristics information held by the setting register 30 and the display control unit 90 for generating a display screen suited for the display unit 12 from handwriting information independent of hardware, the handwriting code processing device of the present embodiment enables even the data detected at devices with different detection precisions to realize proper displays of handwriting. Moreover, since precision of handwriting data to be employed in compression and expansion processing at the handwriting coding unit 40 and the handwriting code decoding unit 80 always remains constant, stable compressibility can be expected.

Next, a handwriting information coding method according to the present embodiment will be described in detail with reference to FIGS. 3, 4, 7, 8, 9, 10, 11 and 12.

At the handwriting coding unit 40, the code length control unit 45 synthesizes a vector code of an acceleration vector generated by the vector code generating unit 43 and a succession code indicative of the number of the same acceleration vectors in succession generated by the succession code generating unit 44 to generate a variable-length code. Variable-length code generated by the code length control unit 45 has a code length determined by the indication whether subsequent one-byte information exists or not depending on the value of the seventh bit on a byte basis as illustrated in FIG. 8. In a one-byte code, for example, the seventh bit will be "0". In a two-byte code, the seventh bit of the first one byte will be "1" and the seventh bit of the subsequent one byte will be "0".

At user's handwriting input, while it is not easy for the user to intentionally move the pen to have a fixed amount of change in speed, stopping the pen makes the acceleration vector set to be "0" with ease. Therefore, when the acceleration vector is "0", the number of the same acceleration vectors will be larger than that of the acceleration vectors whose value is other than "0". In addition, when an absolute value of an acceleration vector is not more than "2", there will exist such vectors with points in eight directions surrounding a starting point as end points as illustrated in the vector code (a) of FIG. 10. When the acceleration vector is not less than "2" and less than "3", there will exist such vectors with points in 16 directions as end points as illustrated in the vector code (b) of FIG. 10. At this time, even if acceleration vectors are generated in random numbers, the number of directions will increase as the acceleration vector is increased, resulting in reducing probability of succession of the same vector. In handwriting input, in particular, it is well known that an acceleration vector is small in magnitude and has little change, which characteristics are used in zone coding that has been described in Related Art. In other words, when an acceleration vector is small, the vector is more likely to succeed one after another and as the acceleration vector is increased in magnitude, the frequency of the occurrences is reduced to lower probability of the succession.

The handwriting code of FIG. 9 is set such that the values of the acceleration vectors are all "0" and as large a number of successions as possible can be expressed as illustrated in the coded data (a) of FIG. 9 by making use of the above-described characteristics that in handwriting input, the magnitude of an acceleration vector is inversely proportional to the number of its successions. Then, in a case where the value of the acceleration vector is not "0", a ratio of the number of bits expressing the acceleration vector to the number of bits expressing the number of successions of the acceleration vector of the same value is set such that as the number of bits of an acceleration vector increases, the number of bits expressing the number of successions decreases. This enables efficient compressed-coding of handwriting input.

Moreover, since coded data is set to be a variable-length code expressed in one byte (eight bits) or a multiple of one byte by the adjustment of a ratio of the relevant numbers of bits, a code length can be determined by referring to a handwriting code byte by byte and comparing only bit 7 of a handwriting code in question and of its immediately preceding and succeeding handwriting codes. As compared with a conventional variable-length code on a bit basis, therefore, partial reference and editing of a sequence of handwriting codes can be made more easily while realizing high compressibility.

More specifically, consideration will be given to the application of the handwriting codes of FIG. 9 to the handwriting information composed of the accelerations 601, 602 and 603 illustrated in FIG. 7.

For expressing the illustrated acceleration vector with a fixed length, a code that can express the largest number of bits existing as the magnitude of an acceleration vector is needed. Assume, for example, that the maximum value of a display screen coordinate is "1023". Since the components of the vector X and the vector Y of an acceleration vector should express values from "0" to "1023", each acceleration vector will need a three-byte code as illustrated in the coded data (e) of FIG. 9. In a case of the handwriting information of FIG. 7 where three acceleration vectors exist, a nine-byte (three-byte codes×3) handwriting code will be generated.

On the other hand, in a case of the application of a variable-length code according to the present embodiment, the acceleration 601 of FIG. 7 whose value of the component of the vector X is "2" and whose value of the component of the vector Y is "2" is expressed as a handwriting code using the coded data (c) of FIG. 9 in which a succession code Ln is 1 and a vector code dXY2 is 2. The accelerations 602 and 603 will be similarly expressed using the coded data (d) of FIG. 9 and turned into a handwriting code of a total of five bytes as illustrated in FIG. 11. As to the handwriting information of FIG. 7, since no succession of the same vector exists, no effect of compression is produced by using the amount of successions, while the code length can be compressed into about 55 percent of a code with a fixed length. Furthermore, assuming, for example, that the acceleration 602 and the acceleration 603 are the same vector, setting a succession code Ln in the coded data (b) to be "2" will have a three-byte handwriting code except the coded data (c) in FIG. 11, resulting in enabling the code length to be compressed into 33 percent of that of a fixed-length code.

At the handwriting coding unit 40, the input resolution control unit 42 lowers a resolution of handwriting information received from the input control unit 20 according to the current rate determined at the input rate determination unit 41 and outputs the information with a reduced resolution to the vector code generating unit 43 and the succession code generating unit 44. In FIG. 12, the vector code (a) shows the number of kinds of vector codes in a case where the components of the vector X and the vector Y of handwriting information range from "−4" to "4". The vector code (b) shows the number of kinds of vector codes in a case where the resolution of the vector code (a) is reduced to one-third, that is, where three points by three points of the vector code (a) are expressed as one point of the vector code (b). While in the vector code (a), there exist 81 (nine points by nine points) vector codes including the starting point, the handwriting information can be expressed by nine (three points by three points) vector codes including the starting point as illustrated in the vector code (b) by reducing the resolution down to one-third. Thus, reduction of the number of kinds of vector codes leads to reduction of a code length constituting a vector code. In addition, even when vectors are generated in random numbers, probability of occurrence of the same vector code is increased, whereby compressibility can be improved both by compression of a variable-length code and compression of a succession code.

The vector code (c) shows a state of reproduction of the vector with the original resolution illustrated in the vector code (a) by tripling the vector code illustrated in the vector code (b) with one-third the resolution. As illustrated in the figure, points denoted by slanting lines in the vector code (b) are tripled in size to be converted into points denoted by slanting lines in the vector code (c). All the points in the vector code (a) are expressed by nine vector codes in the vector code (b) and when the vector codes are reproduced to have the original resolution, they can be expressed as a vector whose error is less than two points (the same point, or any of eight points surrounding the original point) as illustrated in (c).

In handwriting input, in particular, as a precision of movement of the point of a pen for user's intention is lowered when the user inputs quickly like scribbling, precision of a handwriting is lowered as user's input rate becomes higher than an ordinary input rate. Effects exerted on a handwriting by an error of several dots on display coordinates will be reduced accordingly. The input resolution control unit 42 therefore refrains from lowering a resolution when a user inputs at an average handwriting rate and lowers the resolution of handwriting information according to a rate of a rate increase from an average handwriting rate, thereby enabling compressibility of a handwriting code to be improved while maintaining quality of a handwriting intended by the user. As a result, the size of data accumulated is reduced to lessen communication load at data reception and transmission.

Decoding of a handwriting code by the handwriting code decoding unit 80 is conducted in a procedure completely reverse to that of the processing by the handwriting coding unit 40. At the handwriting code decoding unit 80, the code separating unit 81 receives a compressed handwriting code and separates the same into a vector code and a succession code. Then, the vector code decoding unit 82 and the succession code decoding unit 83 convert the vector code and the succession code into a vector and the number of successions of handwriting information, respectively. Then, the output resolution control unit 85 enlarges the vector of handwriting information according to determination results obtained by the output rate determination unit 84 and repeats the enlarged vector as many times as the number of successions received from the succession code decoding unit 83 to generate handwriting information and output the same to the display control unit 90. In this case, because the handwriting coding unit 40 conducts non-reproducible compression, handwriting information that the display control information unit 90 receives is not completely the same as that the input control unit 20 outputs. Handwritings displayed, however, will not largely differ from that intended by a user because the coding by the handwriting coding unit 40 is coding which maintains the quality of handwritings intended by the user according to characteristics of handwriting input.

In addition, as described in the foregoing, there will be a case where the input resolution control unit 42 of the handwriting coding unit 40 reduces handwriting information independently of determination results obtained by the input rate determination unit 41 and inserts a control code indicating that a reduction ratio is modified independently of a handwriting rate before a handwriting code and outputs the obtained code in response to a special instruction from the processing unit 50. In this case, upon receiving the control code indicating that a reduction ratio is changed independently of rate information, the code separating unit 81 of the handwriting code decoding unit 80 instructs the output resolution control unit 85 to change a magnification ratio. Provision of a function of changing a precision of handwriting information according to the instructions from the processing unit 50 thus enables change of a precision depending on a region on a display screen or a kind of pen selected, such as particularly increasing a precision of a signature column. As a result, more efficient compression is possible according to the processing contents in addition to compression according to characteristics of handwriting input.

Next, the operation of the present embodiment as a whole will be described. In the present example of operation, handwriting input is made as indicated by the input locus 301 shown in FIG. 6 and the processing of handwriting codes is conducted whose contents have been described with reference to FIGS. 7 to 12 and FIGS. 14 to 21.

Figure 13:
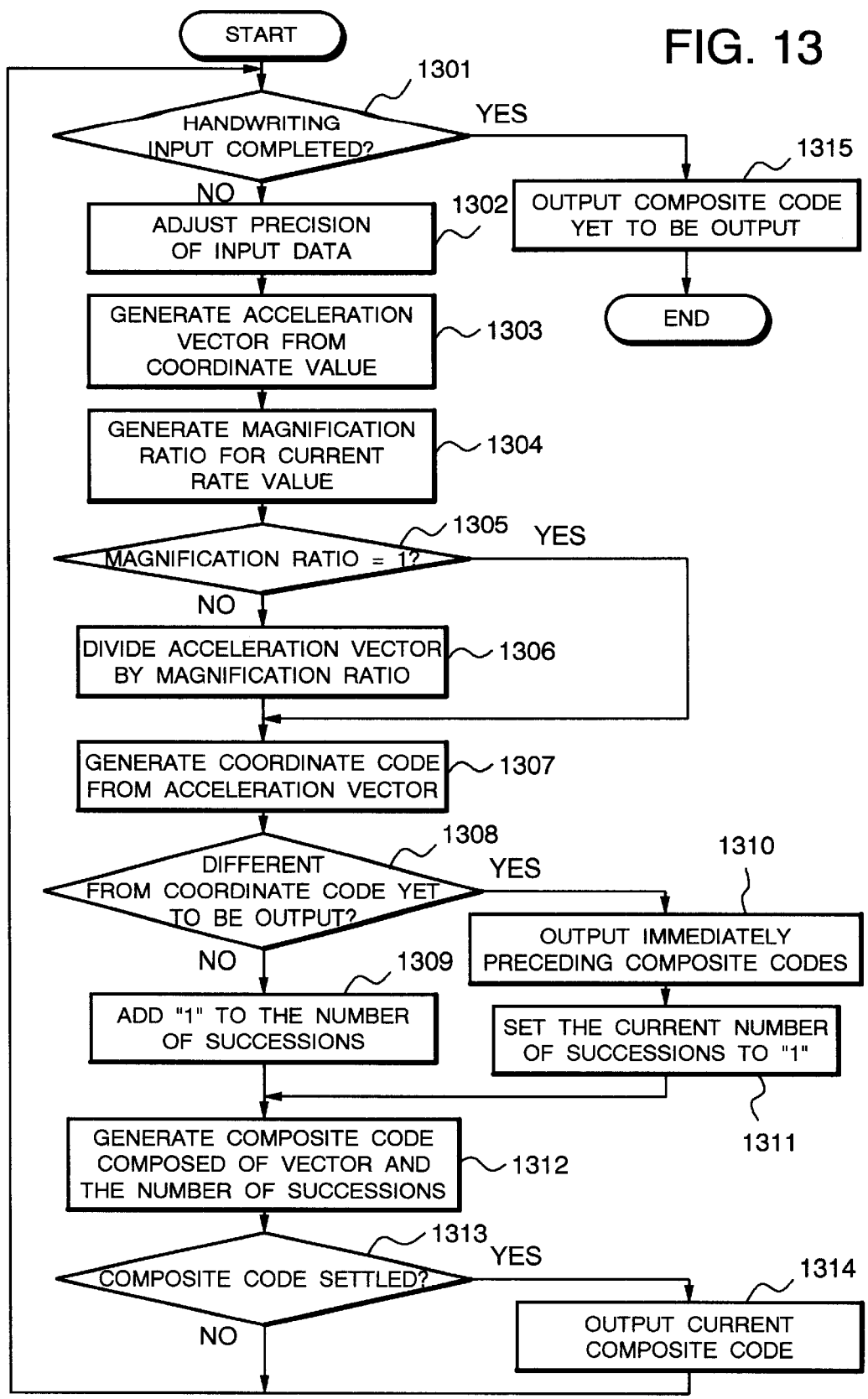
FIG. 13 is a flow chart for use in explaining handwriting code generation operation in the present embodiment.

First, with reference to the flow chart of FIG. 13, description will be made of operation for generating a handwriting code according to the present embodiment. With reference to FIG. 13, the handwriting input unit 11 detects handwriting input by a user to sequentially output the input points 401, 402, 403 and 404 which are coordinate data corresponding to coordinates of the display screen (steps 1301).

Next, the input control unit 20 receives the coordinate data to generate and output handwriting information. More specifically, the detection precision control unit 21 converts the coordinate data into coordinate data independent of hardware according to characteristics information held by the setting register 30 (Step 1302). Then, the input expression converting unit 22 receives the coordinate data from the detection precision control unit 21 to generate and output an acceleration vector (Step 1303). For example, in FIG. 6, at a time point of reception of the coordinate data corresponding to the input point 402, the unit 22 generates the rate 502 as a difference vector between the input point 402 and its immediately preceding input point 401 to generate the acceleration 601 as a difference vector between the rate 502 and the rate 501 similarly generated at a time point of reception of the immediately preceding input point 401. By thus sequentially outputting an acceleration vector for each input point as handwriting information, the handwriting information illustrated in FIG. 7 is generated with respect to the input locus 301 illustrated in FIG. 6.

The handwriting coding unit 40 receives handwriting information as output of the input control unit 20 to generate and output a handwriting code subjected to compressed-coding according to characteristics of user's handwriting input. More specifically, the input rate determination unit 41 determines the current input rate from such handwriting information as illustrated in FIG. 7 which is output from the input expression converting unit 22 to calculate a magnification ratio of an input resolution (Step 1304). Then, according to the magnification ratio calculated by the input rate determination unit 41, the input resolution control unit 42 outputs the handwriting information received from the input expression converting unit 22 without modification when the magnification ratio is "1", and when the magnification ratio is other than "1", lowers the resolution of the handwriting information according to the magnification ratio and outputs the obtained handwriting information (Steps 1305 and 1306).

Converting a resolution in some cases results in having user's handwriting input indicated as the input locus 301 and the display on the display screen of the display unit 12 indicated by the display locus 302 failing to correspond with each other as illustrated in FIG. 14. More specifically, description will be made of a procedure for generating the display point 412 when the input point 402 is detected after the input point 401 is input and its corresponding display point 411 is displayed. With reference to FIG. 15, at a time point when the display point 411 is displayed, the rate 511 as a difference vector between the display point 411 and its immediately preceding display point is generated. Next, when the input point 402 is detected, an acceleration vector will be generated as a vector from the end point of the rate 511 to the input point 402 (vector whose component of the vector X is "5" and whose component of the vector Y is "4" in FIG. 15) in the same procedure as that of the acceleration vector generation. At this time, when the input rate determination unit 41 detects the rate 511 being higher than that of ordinary user input to calculate a magnification ratio of "3", the input resolution control unit 42 changes both the components of the vector X and the vector Y of the acceleration vector from the end point of the rate 511 to the input point 402 to one-third in magnitude and outputs the changed handwriting information. As will be described later with respect to the operation of the handwriting code decoding unit 80, since before displaying, the handwriting information is again converted to have the original resolution, that is, to have a triple magnitude, the acceleration vector corresponding to the input point 402 will be the acceleration 611 of FIG. 15 as a result and the display point 412 will be displayed as the end point of the acceleration 611. Furthermore, the rate 512 is calculated as a difference vector between the display point 411 and the display point 412 to newly generate an acceleration vector and a display point in the same manner at a time point when the subsequent input point is obtained. Thus, with respect to the input locus 301 of FIG. 14, the input resolution control unit 42 generates and outputs the handwriting information illustrated in FIG. 16 with resolutions of the accelerations 611, 612 and 613 reduced to one-third.

Next, the vector code generating unit 43 receives the handwriting information from the input resolution control unit 42 to output a vector code indicative of the magnitude of an acceleration vector (Step 1307). In addition, the succession code generating unit 44 receives the handwriting information from the input resolution control unit 42 to determine whether the same acceleration vector succeeds one after another (Step 1308) and outputs a succession code indicative of the number of successions (Steps 1309, 1310 and 1311). Upon receiving the handwriting information illustrated in FIG. 16, for example, the vector code generating unit 43 generates such a vector code as shown in FIG. 17 and the succession code generating unit 44 outputs "3" as the number of its successions.

Next, the code length control unit 45 synthesizes the vector code received from the vector code generating unit 43 and the succession code received from the succession code generating unit 44 to generate a variable-length handwriting code (Step 1312). A handwriting code to be output from the code length control unit 45 is a variable-length code composed of a number of fundamental bits (eight bits) or a multiple of the number and a ratio of vector codes to succession codes is set such that a larger number of successions can be expressed as an acceleration vector is decreased in magnitude. In a case, for example, where the handwriting information illustrated in FIG. 16 is expressed by the vector code shown in FIG. 17 and the succession code of "3", since the component of the vector X and the component of the vector Y of the vector code are both "1", the coded data (b) of FIG. 9 is applied to set the succession code Ln to "3" and the vector of FIG. 17 is compared with the vector code (a) of FIG. 10 to generate a one-byte handwriting code illustrated in FIG. 18 with the value "1" substituted for the vector code dXY1. Thus obtained handwriting code has a code length compressed into about 20 percent of the five-byte handwriting code (FIG. 11) corresponding to the handwriting information (FIG. 7) obtained when no resolution change is made of the same input locus 301 (FIG. 6). At the outputting of thus obtained handwriting code, the code length control unit 45 updates a succession code of the current handwriting code when a vector code received from the vector code generating unit 43 is the same as that yet to be output (Step 1309) and when it differs from a vector code yet to be output, outputs immediately preceding handwriting codes (Step 1310) to generate a new handwriting code with the current vector code and the succession code of "1" (Step 1311), thereby generating a handwriting code as the synthesis of the vector code and the succession code.

Furthermore, upon detecting the code being settled when the succession code of the generated handwriting code attains the maximum expressible value, the unit 45 outputs the current handwriting code (Steps 1313 and 1314). Thereafter, with respect to the subsequent input point, Steps 1301 to 1314 will be similarly repeated to output a handwriting code, if any, yet to be output which is not settled at a time point when handwriting input is completed (Step 1315).

The processing unit 50 receives thus generated handwriting code and executes processing corresponding to the code to output a handwriting code for display to be displayed on the display unit 12 according to the processing results. According to the processing results or results of communication with other handwriting code processing device through the communication unit 70, the processing unit 50 also accumulates handwriting codes at the data accumulation unit 60, modifies characteristics information held at the setting register 30, instructs the handwriting coding unit 40 to modify the coding method and communicates handwriting codes by means of the communication unit 70. Using a handwriting code subjected to compressed-coding by the processing unit 50 enables reduction in load on data communication and reduction in size of handwriting input data stored at the data accumulation unit 60. In addition, since handwriting codes compressed by using the number of successions can be batch-processed by the processing device and the display device as a repetition of the same processing, processing load is reduced to realize high-speed processing. Moreover, since the processing unit 50 is allowed to modify characteristics information of the setting register and a handwriting coding method, when a real-time rapid response is required, for example, at the telewriting communication, efficient codes according not only to characteristics of handwriting input but also to the current processing contents can be generated such as by changing a precision of handwriting input.

Next, the handwriting code decoding unit 80 receives the handwriting code for display from the processing unit 50 to output handwriting information decoded by a procedure exactly reverse to that by the handwriting coding unit 40. More specifically, the code separating unit 81 of the handwriting code decoding unit 80 separates a handwriting code into a vector code and a succession code by the procedure reverse to that by the code length control unit 45. In addition, when receiving a control code indicating that a reduction ratio is changed independently of rate information, the unit 81 instructs the output resolution control unit 85 to change an enlargement ratio. Next, the vector code decoding unit 82 generates an acceleration vector of handwriting information from the vector code by the processing reverse to that by the vector code generating unit 43. The succession code decoding unit 83 generates the number of successions of the acceleration vectors from the succession code by the processing reverse to that by the succession code generating unit 44. Next, the output rate determination unit 84 determines a rate of handwriting information to be output to calculate a magnification ratio for improving a resolution by the processing reverse to that by the input rate determination unit 41. Then, the output resolution control unit 85 receives the acceleration vector and the number of its successions of the handwriting information from the vector code decoding unit 82 and the succession code decoding unit 83 to improve the resolution of the handwriting information according to the magnification ratio calculated by the output rate determination unit 84 and output the obtained handwriting information with an improved resolution to the display control unit 90.

More specifically, for example, after the display point 411 of FIG. 14 is displayed, upon receiving the handwriting code of FIG. 18 generated by the handwriting coding unit 40 corresponding to the input points 402, 403 and 404, the code separating unit 81 finds that the handwriting code is of one byte having the variable-length structure illustrated in FIG. 8 because bit 7 of the handwriting code is "0". The unit 81 also finds that the handwriting code is a code of the coded data (b) shown in FIG. 9 because bit 6 is "1". Then, the unit 81 outputs the value of dXY1 to the vector code decoding unit 82 and the value of Ln to the succession code decoding unit 83. From the value "1" of dXY1, the vector code decoding unit 82 finds that it is a vector whose components of the vector X and the vector Y are both "1" in the vector code (a) of FIG. 10 to output the vector of the handwriting information illustrated in FIG. 19 to the output resolution control unit 85. The succession code decoding unit 83 also outputs "3" as the number of successions to the output resolution control unit 85 because the value of Ln is "3". Next, the output rate determination unit 84 detects the rate 511 as the rate vector of the current display locus 301 being higher than an ordinary handwriting rate to calculate "3" as the magnification ratio. Lastly, the output resolution control unit 85 triples the resolution of the vector illustrated in FIG. 19 based on the magnification ratio received from the output rate determination unit 84 to generate a vector shown in FIG. 20 and copies the vector illustrated in FIG. 20 as many times as the number of successions to generate three vectors as illustrated in FIG. 21. These three vectors correspond to the accelerations 611, 612 and 613 in FIG. 14.

Next, the display control unit 90 receives handwriting information from the handwriting code decoding unit 80 to generate a display screen suited for the display unit 12 according to the characteristics information held at the setting register 30 and outputs the display screen to the display unit 12. More specifically, first the output expression converting unit 91 receives handwriting information expressed as an acceleration vector from the output resolution control unit 85 and converts the same into coordinate data. When receiving the handwriting information shown in FIG. 21 after the display point 411 of FIG. 14 is displayed, for example, the output expression converting unit 91 calculates the display point 412 from the end point of the acceleration 611 with the end point of the rate 511 corresponding to the display point 411 as its starting point as illustrated in FIG. 15 to output coordinate data of the calculated point. Then, the unit 91 generates the rate 512 from a difference vector between the display point 411 and the display point 412. Similarly, the unit 91 generates and outputs coordinate data of the display point 413 from the acceleration 612 and coordinate data of the display point 414 from the acceleration 613. Next, the display precision control unit 92 receives the coordinate data from the output expression converting unit 91 and converts the same into coordinate data suited for the display unit 12 according to the characteristics information held at the setting register 30. The dynamic display control unit 93 then receives the coordinate data form the display precision control unit 92 to generate a dynamic display screen and outputs the screen to the display unit 12.

As described in the foregoing, in the handwriting code processing device according to the present embodiment, the input control unit 20 generates handwriting data independent of hardware, the handwriting coding unit 40 conducts highly efficient compressed-coding based on the characteristics of handwriting input while maintaining the quality of a handwriting, the processing unit 50 adjusts a precision of a handwriting code according to the contents of processing, the handwriting code decoding unit 80 decodes a handwriting code and the display control unit 90 generates a display screen suited for the display unit 12 according to the handwriting characteristics. Using a handwriting code subjected to compressed-coding by the processing unit 50 enables reduction in communication load and accumulation capacity. In addition, since a handwriting code compressed by using the number of successions can be batch-processed as a repetition of the same processing by the processing device and the display device, processing load is reduced to enable efficient processing at a high speed. Moreover, since the processing unit 50 is allowed to modify the characteristics information held at the setting register and a handwriting coding method, generation of an efficient code is possible according not only to characteristics of handwriting input but also to the contents of processing. As a result, the handwriting code processing device of the present embodiment allows efficient and good-response handwriting operation using an efficient code without deteriorating handwriting characteristics, thereby enabling physical characteristics of paper and writing utensils to be sufficiently reproduced.

Although in the present embodiment, a ratio of the number of bits of a succession code to that of a vector code and structure of a variable-length code have been described with respect the code system shown in FIG. 9, they are not limited those described. The same effects can be expected even if the code system is changed according to such conditions as performance of a device, high-speed required of real-time processing and necessity of load reduction by batch-processing as long as variable-length codes are used whose combination allows the magnitude of a vector and the number of successions are inversely proportional to each other according to characteristics of handwriting input.

Also in the present embodiment, although the code generation procedure has been described with respect to the steps shown in FIG. 13, the procedure is not limited thereto. The same effects can be expected even when the order of the resolution modifying step, the vector code generating step and the succession code generating step are changed taking a processing procedure optimum for the device into consideration as long as a handwriting code with a succession code or a resolution modified according to characteristics of handwriting input is generated.

As described in the foregoing, by conducting efficient handwriting code generation and processing based on characteristics of man's handwriting input, the handwriting code processing device and the processing method thereof of the present invention drastically improve efficiency of processing including data communication and data accumulation without deteriorating quality of a handwriting, as well as realizing efficient and good-response handwriting input which sufficiently reproduces physical characteristics of writing utensils.

Moreover, having the input control means for converting coordinate data detected at the handwriting input means into handwriting information independent of hardware according to characteristics information held by the resetting register and the display control means for generating a display screen suited for the display means from handwriting information independent of hardware, the handwriting code processing device and the processing method thereof of the present invention enable even data detected by devices differing in detection precision to have proper handwriting displays.

Furthermore, stable compressibility is expected because a precision of handwriting data used in compression and expansion processing at the handwriting coding means and the handwriting code decoding means always remains constant.

The handwriting code processing device and the processing method thereof of the present invention also realize efficient compressed-coding of handwriting input by generating such a handwriting code as having the number of bits representing the number of successions reduced as the number of bits of an acceleration vector is increased by making use of the characteristics that in handwriting input, the magnitude of an acceleration vector and the number of successions are inversely proportional to each other.

Furthermore, using a variable-length code expressed by a number of fundamental bits or by a multiple thereof more facilitates partial reference and editing of a sequence of handwriting codes while realizing higher compressibility than using a conventional variable-length code on a bit basis.

Moreover, it is possible to improve compressibility of a handwriting code while maintaining quality of a handwriting that a user intends to reduce a capacity at the accumulation and load at the communication by refraining from lowering a resolution when the user inputs at an average handwriting rate and lowering a resolution of handwriting information according to a rate of a speed increase from an average handwriting speed.

In addition, a handwriting displayed will not largely differ from that a user intends because coding, thought it is of non-reproducible compression, is conducted maintaining quality of the handwriting that the user intends according to characteristics of handwriting input.

Provision of a function of changing a precision of handwriting information in response to instructions from the processing means also enables a change of precision according to a region on the display screen or a kind of pen selected, such as improvement of a precision of a signature column, thereby allowing more efficient compression according to processing contents in addition to compression according to characteristics of handwriting input.

In addition, use of a handwriting code subjected to compressed-coding by the processing means allows the handwriting code processing device and the processing method thereof of the present invention to reduce communication load and a size of data accumulated.

Moreover, since a handwriting code compressed by using the number of successions can be batch-processed as a repetition of the same processing by the processing device and the display device, processing load is reduced to enable efficient processing at a high speed.

Furthermore, allowing the processing means to modify characteristics information of the setting register and a handwriting coding method makes it possible to generate efficient codes according not only to characteristics of handwriting input but also to the current processing contents.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A handwriting code processing device for processing handwriting input data mounted on a handwriting input device which electronically realizes operability of writing utensils that paper and a pen produce by combining display means for displaying two-dimensional image and handwriting input means for detecting user's handwriting operation to obtain coordinate data corresponding to screen coordinates of said display means, comprising:

setting register for holding information about hardware characteristics of said display means and said handwriting input means;

input control means for converting coordinate data detected by said handwriting input means into handwriting information independent of hardware according to characteristics information held by said setting register;

processing means for receiving handwriting information from said input control means to execute data processing and generating and outputting handwriting information for display to be displayed on said display means according to processing results; and display control means for generating a display screen from said handwriting information for display and causing said display means to display the display screen according to characteristics information held by said setting register.

2. The handwriting code processing device as set forth in claim 1, wherein said processing means modifies characteristics information held by said setting register based on said processing results as required.

3. The handwriting code processing device as set forth in claim 1, wherein said input control means outputs, as said handwriting information, an acceleration vector which is a difference vector of rate vectors linking two coordinate points among successive input coordinate points.

4. The handwriting code processing device as set forth in claim 1, further comprising communication means for communicating with other handwriting code processing device, wherein said processing means has a further function of modifying characteristics information held by said setting register based on results of communication with other handwriting code processing device connected through said communication means as required.

5. A handwriting code processing device for processing handwriting input data mounted on a handwriting input device which electronically realizes operability of writing utensils that paper and a pen produce by combining display means for displaying two-dimensional image and handwriting input means for detecting user's handwriting operation to obtain coordinate data corresponding to screen coordinates of said display means, comprising:

setting register for holding information about hardware characteristics of said display means and said handwriting input means;

input control means for converting coordinate data detected by said handwriting input means into handwriting information independent of hardware according to characteristics information held by said setting register;

handwriting coding means for receiving handwriting information from said input control means to generate and output a handwriting code subjected to compressed-coding according to characteristics of the handwriting information;

processing means for receiving a handwriting code subjected to compressed-coding from said handwriting coding means to execute data processing and generating and outputting a handwriting code for display subjected to compressed-coding to be displayed on said display means according to processing results;

handwriting code decoding means for receiving said handwriting code for di splay from said processing means and decoding the code to generate and output handwriting information for display; and display control means for receiving said handwriting information for display from said handwriting code decoding means to generate a display screen from said handwriting information for display and causing said display means to display the display screen according to characteristics information held by said setting register.

6. The handwriting code processing device as set forth in claim 5, wherein said processing means modifies characteristics information held by said setting register based on said processing results as required.

7. The handwriting code processing device as set forth in claim 5, wherein said handwriting coding means comprises:

vector code generating means for extracting a vector component of said handwriting information received from said input control means to generate a vector code, succession code generating means for extracting the same values in succession of said handwriting information to generate a succession code, and code length control means for receiving said vector code from said vector code generating means and said succession code from said succession code generating means to generate a handwriting code by adjusting and synthesizing code lengths of said vector code and said succession code so as to have data of the size of a predetermined number of fundamental bits or a multiple of the number, and said handwriting code decoding means comprises:

code separating means for receiving said handwriting code to separate said code into said vector code and said succession code and outputting the codes separately, vector code decoding means for decoding and outputting said vector code obtained by said code separating means, and succession code decoding means for decoding and outputting said succession code obtained by said code separating means.

8. The handwriting code processing device as set forth in claim 5, wherein said handwriting coding means comprises:

input rate determining means for determining an input rate of handwriting operation from said handwriting information received from said input control means, input resolution control means for reducing said handwriting information based on determination results obtained by said input rate determining means and outputting the reduced handwriting information as required, vector code generating means for extracting a vector component of said handwriting information suitably reduced by said input resolution control means to generate a vector code, succession code generating means for extracting the same values in succession of said handwriting information suitably reduced by said input resolution control means to generate a succession code, and code length control means for receiving said vector code from said vector code generating means and said succession code from said succession code generating means to generate a handwriting code by adjusting and synthesizing code lengths of said vector code and said succession code so as to have data of the size of a predetermined number of fundamental bits or a multiple of the number, and said handwriting code decoding means comprises:

code separating means for receiving said handwriting code to separate said code into said vector code and said succession code and outputting the codes separately, vector code decoding means for decoding and outputting said vector code obtained by said code separating means, succession code decoding means for decoding and outputting said succession code obtained by said code separating means, output rate determining means for determining, from handwriting information output to said display control means, a rate of the corresponding handwriting input, and output resolution control means for receiving input of decoded handwriting information from said vector code decoding means and said succession code decoding means to suitably expand the handwriting information according to determination results obtained by said output rate determining means and output the obtained information as said handwriting information.

9. The handwriting code processing device as set forth in claim 5, wherein said handwriting coding means comprises:

vector code generating means for extracting a vector component of said handwriting information received from said input control means to generate a vector code, succession code generating means for extracting the same values in succession of said handwriting information to generate a succession code, and code length control means for receiving said vector code from said vector code generating means and said succession code from said succession code generating means to generate a handwriting code by adjusting and synthesizing code lengths of said vector code and said succession code so as to increase a code length of said succession code when a code length of said vector code is short and shorten the code length of said succession code when the code length of said vector code is long and so as to make said vector code and said succession code a variable-length code with eight bits or an integral multiple of eight bits, said handwriting code decoding means comprises:
code separating means for receiving said handwriting code to separate said code into said vector code and said succession code and outputting the codes separately,
vector code decoding means for decoding and outputting said vector code obtained by said code separating means, and
succession code decoding means for decoding and outputting said succession code obtained by said code separating means.

10. The handwriting code processing device as set forth in claim 5, wherein said handwriting coding means comprises:
input rate determining means for determining an input rate of handwriting operation from said handwriting information received from said input control means,
input resolution control means for reducing said handwriting information based on determination results obtained by said input rate determining means and outputting the reduced handwriting information as required,
vector code generating means for extracting a vector component of said handwriting information suitably reduced by said input resolution control means to generate a vector code,
succession code generating means for extracting the same values in succession of said handwriting information suitably reduced by said input resolution control means to generate a succession code, and
code length control means for receiving said vector code from said vector code generating means and said succession code from said succession code generating means to generate a handwriting code by adjusting and synthesizing code lengths of said vector code and said succession code so as to increase a code length of said succession code when a code length of said vector code is short and shorten the code length of said succession code when the code length of said vector code is long and so as to make said vector code and said succession code a variable-length code with eight bits or an integral multiple of eight bits, and
said handwriting code decoding means comprises:
code separating means for receiving said handwriting code to separate said code into said vector code and said succession code and outputting the codes separately,
vector code decoding means for decoding and outputting said vector code obtained by said code separating means,
succession code decoding means for decoding and outputting said succession code obtained by said code separating means,
output rate determining means for determining, from handwriting information output to said display control means, a rate of the corresponding handwriting input, and
output resolution control means for receiving input of decoded handwriting information from said vector code decoding means and said succession code decoding means to suitably expand the handwriting information according to determination results obtained by said output rate determining means and output the obtained information.

11. The handwriting code processing device as set forth in claim 5, wherein said processing means has a further function of giving instructions to modify a coding method of said handwriting coding means based on processing results,
when modifying a coding method in response to said instruction from said processing means, said handwriting coding means inserts a control code indicating that the coding method is changed into said handwriting code and outputs the obtained handwriting code,
when said control code is inserted in said handwriting code, said processing means inserts said control code into said handwriting code for display and outputs the obtained handwriting code, and
upon reception of said control code inserted in said handwriting code for display, said handwriting code decoding means modifies a method of decoding the handwriting code for display according to the control code.

12. The handwriting code processing device as set forth in claim 5, wherein said input control means outputs, as said handwriting information, an acceleration vector which is a difference vector of rate vectors linking two coordinate points among successive input coordinate points, and
said handwriting code decoding means outputs, as said handwriting information for display, an acceleration vector corresponding to said acceleration vector output from said input control means.

13. The handwriting code processing device as set forth in claim 5, further comprising communication means for communicating with other handwriting code processing device, wherein
said processing means has a further function of modifying characteristics information held by said setting register based on results of communication with other handwriting code processing device connected through said communication means as required.

14. The handwriting code processing device as set forth in claim 5, further comprising communication means for communicating with other handwriting code processing device, wherein
said processing means has a further function of instructing said handwriting coding means to modify a coding method and modifying characteristics information held by said setting register based on results of communication with other handwriting code processing device connected through said communication means as required,
when modifying a coding method in response to said instruction from said processing means, said handwriting coding means inserts a control code indicating that the coding method is changed into said handwriting code and outputs the obtained handwriting code,
when said control code is inserted in said handwriting code, said processing means inserts said control code into said handwriting code for display and outputs the obtained handwriting code, and
upon reception of said control code inserted in said handwriting code for display, said handwriting code decoding means modifies a method of decoding the handwriting code for display according to the control code.

15. A handwriting code processing method of processing handwriting input data at a handwriting input device which electronically realizes operability of writing utensils that paper and a pen produce by combining display means for displaying two-dimensional image and handwriting input means for detecting user's handwriting operation to obtain coordinate data corresponding to screen coordinates of said display means, comprising the steps of:

converting coordinate data detected by said handwriting input means into handwriting information independent of hardware according to information about hardware characteristics of said display means and said handwriting input means;

generating and outputting a handwriting code subjected to compressed-coding according to characteristics of said handwriting information generated at said handwriting information generating step;

conducting data processing with respect to said handwriting code subjected to compressed-coding at said coding step to generate and output a handwriting code for display subjected to compressed-coding to be displayed on said display means according to processing results;

decoding said handwriting code for display generated at said handwriting code for display generating step to generate and output handwriting information for display; and generating a display screen from said handwriting information for display decoded at said handwriting code decoding step and causing said display means to display the display screen according to characteristics information held by said setting register.

16. The handwriting code processing method as set forth in claim 15, wherein said coding step comprises the steps of:

extracting a vector component of said handwriting information to generate a vector code, extracting the same values in succession of said handwriting information to generate a succession code, and using and synthesizing said vector code and said succession code generated by adjusting code lengths of said vector code and said succession code so as to have data of the size of a predetermined number of fundamental bits or a multiple of the number to generate a handwriting code, and said handwriting code decoding step comprises the steps of:

separating said handwriting code into said vector code and said succession code and outputting the codes separately, decoding and outputting said vector code obtained, and decoding and outputting said succession code obtained.

17. The handwriting code processing method as set forth in claim 15, wherein said coding step comprises the steps of:

determining an input rate of handwriting operation from said handwriting information, reducing said handwriting information based on determination results of said input rate and outputting the obtained handwriting information as required, extracting a vector component of said handwriting information suitably reduced to generate a vector code, extracting the same values in succession of said handwriting information suitably reduced to generate a succession code, and using and synthesizing said vector code and said succession code generated by adjusting code lengths of said vector code and said succession code so as to have data of the size of a predetermined number of fundamental bits or a multiple of the number to generate a handwriting code, and said handwriting code decoding step comprises the steps of:

separating said handwriting code into said vector code and said succession code and outputting the codes separately, decoding and outputting said vector code obtained, decoding and outputting said succession code obtained, and from said vector code and said succession code decoded, determining a rate of the corresponding handwriting input, as well as suitably expanding and outputting said handwriting information according to determination results.

18. The handwriting code processing method as set forth in claim 15, wherein said coding step comprises the steps of:

extracting a vector component of said handwriting information to generate a vector code, extracting the same values in succession of said handwriting information to generate a succession code, and using and synthesizing said vector code and said succession code generated by adjusting code lengths of said vector code and said succession code so as to increase the code length of said succession code when the code length of said vector code is short and shorten the code length of said succession code when the code length of said vector code is long and so as to make said vector code and said succession code a variable-length code with eight bits or an integral multiple of eight bits to generate a handwriting code, and said handwriting code decoding step comprises the steps of:

separating said handwriting code into said vector code and said succession code and outputting the codes separately, decoding and outputting said vector code obtained, and decoding and outputting said succession code obtained.

19. The handwriting code processing method as set forth in claim 15, wherein said coding step comprises the steps of:

determining an input rate of handwriting operation from said handwriting information, reducing said handwriting information based on determination results of said input rate and outputting the obtained handwriting information as required, extracting a vector component of said handwriting information suitably reduced to generate a vector code, extracting the same values in succession of said handwriting information suitably reduced to generate a succession code, and using and synthesizing said vector code and said succession code generated by adjusting code lengths of said vector code and said succession code so as to increase the code length of said succession code when the code length of said vector code is short and shorten the code length of said succession code when the code length of said vector code is long and so as to make said vector code and said succession code a variable-length code with eight bits or an integral multiple of eight bits to generate a handwriting code, and said handwriting code decoding step comprises the steps of:

separating said handwriting code into said vector code and said succession code and outputting the codes separately, decoding and outputting said vector code obtained, decoding and outputting said succession code obtained, and from said vector code and said succession code decoded, determining a rate of the corresponding handwriting input, as well as suitably expanding and outputting said handwriting information according to determination results.

20. A computer readable memory storing a control program for processing handwriting input data by controlling a handwriting input device which electronically realizes operability of writing utensils that paper and a pen produce by combining display means for displaying two-dimensional image and handwriting input means for detecting user's handwriting operation to obtain coordinate data corresponding to screen coordinates of said display means, said control program comprising the steps of:

converting coordinate data detected by said handwriting input means into handwriting information independent of hardware according to information about hardware characteristics of said display means and said handwriting input means;

generating and outputting a handwriting code subjected to compressed-coding according to characteristics of said handwriting information generated at said handwriting information generating step;

conducting data processing with respect to said handwriting code subjected to compressed-coding at said coding step to generate and output a handwriting code for display subjected to compressed-coding to be displayed on said display means according to processing results;

decoding said handwriting code for display generated at said handwriting code for display generating step to generate and output handwriting information for display; and generating a display screen from said handwriting information for display decoded at said handwriting code decoding step and causing said display means to display the display screen according to characteristics information held by said setting register.

21. The computer readable memory as set forth in claim 20, wherein said coding step of said control program comprises the steps of:

extracting a vector component of said handwriting information to generate a vector code, extracting the same values in succession of said handwriting information to generate a succession code, and using and synthesizing said vector code and said succession code generated by adjusting code lengths of said vector code and said succession code so as to have data of the size of a predetermined number of fundamental bits or a multiple of the number to generate a handwriting code, and said handwriting code decoding step comprises the steps of:

separating said handwriting code into said vector code and said succession code and outputting the codes separately, decoding and outputting said vector code obtained, and decoding and outputting said succession code obtained.

22. The computer readable memory as set forth in claim 20, wherein said coding step of said control program comprises the steps of:

determining an input rate of handwriting operation from said handwriting information, reducing said handwriting information based on determination results of said input rate and outputting the obtained handwriting information as required, extracting a vector component of said handwriting information suitably reduced to generate a vector code, extracting the same values in succession of said handwriting information suitably reduced to generate a succession code, and using and synthesizing said vector code and said succession code generated by adjusting code lengths of said vector code and said succession code so as to have data of the size of a predetermined number of fundamental bits or a multiple of the number to generate a handwriting code, and said handwriting code decoding step comprises the steps of:

separating said handwriting code into said vector code and said succession code and outputting the codes separately, decoding and outputting said vector code obtained, decoding and outputting said succession code obtained, and from said vector code and said succession code decoded, determining a rate of the corresponding handwriting input, as well as suitably expanding and outputting said handwriting information according to determination results.

23. The computer readable memory as set forth in claim 20, wherein said coding step of said control program comprises the steps of:

extracting a vector component of said handwriting information to generate a vector code, extracting the same values in succession of said handwriting information to generate a succession code, and using and synthesizing said vector code and said succession code generated by adjusting code lengths of said vector code and said succession code so as to increase the code length of said succession code when the code length of said vector code is short and shorten the code length of said succession code when the code length of said vector code is long and so as to make said vector code and said succession code a variable-length code with eight bits or an integral multiple of eight bits to generate a handwriting code, and said handwriting code decoding step comprises the steps of:

separating said handwriting code into said vector code and said succession code and outputting the codes separately, decoding and outputting said vector code obtained, and decoding and outputting said succession code obtained.

24. The computer readable memory as set forth in claim 20, wherein said coding step of said control program comprises the steps of:
- determining an input rate of handwriting operation from said handwriting information,
- reducing said handwriting information based on determination results of said input rate and outputting the obtained handwriting information as required,
- extracting a vector component of said handwriting information suitably reduced to generate a vector code,
- extracting the same values in succession of said handwriting information suitably reduced to generate a succession code, and
- using and synthesizing said vector code and said succession code generated by adjusting code lengths of said vector code and said succession code so as to increase the code length of said succession code when the code length of said vector code is short and shorten the code length of said succession code when the code length of said vector code is long and so as to make said vector code and said succession code a variable-length code with eight bits or an integral multiple of eight bits to generate a handwriting code, and said handwriting code decoding step comprises the steps of:
- separating said handwriting code into said vector code and said succession code and outputting the codes separately,
- decoding and outputting said vector code obtained,
- decoding and outputting said succession code obtained, and
- from said vector code and said succession code decoded, determining a rate of the corresponding handwriting input, as well as suitably expanding and outputting said handwriting information according to determination results.

* * * * *